US008691883B2

(12) United States Patent
Cho et al.

(10) Patent No.: US 8,691,883 B2
(45) Date of Patent: Apr. 8, 2014

(54) AEROGEL-FOAM COMPOSITES

(75) Inventors: Myung-Dong Cho, Hwaseong-si (KR);
Sang-Ho Park, Seoul (KR);
Kwang-Hee Kim, Seoul (KR);
Sung-Woo Hwang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 211 days.

(21) Appl. No.: 13/165,578

(22) Filed: Jun. 21, 2011

(65) Prior Publication Data

US 2011/0311802 A1     Dec. 22, 2011

Related U.S. Application Data

(63) Continuation-in-part of application No. 12/553,248, filed on Sep. 3, 2009, now Pat. No. 8,119,700, which is a continuation-in-part of application No. 12/886,313, filed on Sep. 20, 2010, which is a continuation-in-part of application No. 12/834,438, filed on Jul. 12, 2010, which is a continuation-in-part of application No. 12/891,143, filed on Sep. 27, 2010, which is a continuation-in-part of application No. 13/072,137, filed on Mar. 25, 2011, which is a continuation-in-part of application No. 12/880,896, filed on Sep. 13, 2010, which is a continuation-in-part of application No. 12/982,148, filed on Dec. 30, 2010.

(30) Foreign Application Priority Data

| Feb. 11, 2009 | (KR) | ............................. | 2009-0010967 |
| Sep. 24, 2009 | (KR) | ............................. | 2009-0090718 |
| Nov. 5, 2009 | (KR) | ........................ | 10-2009-0106641 |
| Feb. 12, 2010 | (KR) | ............................. | 2010-013640 |
| Mar. 30, 2010 | (KR) | ............................. | 2010-0028824 |
| Apr. 1, 2010 | (KR) | ............................. | 2010-0030136 |
| Jun. 21, 2010 | (KR) | ........................ | 10-2010-0058799 |
| Mar. 27, 2011 | (KR) | ............................. | 2010-027602 |

(51) Int. Cl.
*B32B 3/26* (2006.01)
*C08J 9/35* (2006.01)

(52) U.S. Cl.
USPC ................... 521/61; 521/62; 521/63; 521/64; 521/82; 521/134; 521/137; 521/138; 521/139; 521/155; 521/170

(58) Field of Classification Search
USPC ........... 521/61, 62, 63, 64, 82, 134, 137, 138, 521/139, 155, 170
See application file for complete search history.

(56) References Cited

U.S. PATENT DOCUMENTS

| 3,549,481 | A | | 12/1970 | Cesare et al. |
| 4,267,120 | A | * | 5/1981 | Cuscurida et al. ............ 558/267 |
| 4,468,483 | A | * | 8/1984 | Yeakey et al. ................. 521/172 |
| 4,568,702 | A | * | 2/1986 | Mascioli ....................... 521/112 |
| 4,873,218 | A | | 10/1989 | Pekala |
| 4,966,919 | A | | 10/1990 | Williams, Jr. et al. |
| 4,997,804 | A | | 3/1991 | Pekala |
| 5,124,364 | A | | 6/1992 | Wolff et al. |
| 5,137,927 | A | | 8/1992 | Wolff et al. |
| 5,159,049 | A | | 10/1992 | Allen |
| 5,389,288 | A | | 2/1995 | Rindo et al. |
| 5,420,168 | A | | 5/1995 | Mayer et al. |
| 5,484,818 | A | | 1/1996 | De Vos et al. |
| 5,508,341 | A | | 4/1996 | Pekala et al. |
| 5,945,084 | A | | 8/1999 | Droege |
| 5,948,879 | A | | 9/1999 | Mori et al. |
| 5,990,184 | A | * | 11/1999 | Biesmans ....................... 521/64 |
| 6,040,375 | A | | 3/2000 | Behme et al. |
| 6,316,092 | B1 | | 11/2001 | Frank et al. |
| 6,503,655 | B1 | | 1/2003 | Petricevic et al. |
| 6,887,563 | B2 | | 5/2005 | Frank et al. |
| 7,118,801 | B2 | | 10/2006 | Ristic-Lehmann et al. |
| 7,282,466 | B2 | | 10/2007 | Long et al. |
| 7,316,919 | B2 | | 1/2008 | Childs et al. |
| 2001/0038933 | A1 | | 11/2001 | Gebhardt et al. |
| 2002/0173554 | A1 | | 11/2002 | Baumann et al. |
| 2004/0063035 | A1 | | 4/2004 | Nagano et al. |
| 2004/0142149 | A1 | | 7/2004 | Mollendorf et al. |
| 2005/0131089 | A1 | | 6/2005 | Kocon et al. |
| 2007/0036959 | A1 | | 2/2007 | Yamato et al. |
| 2007/0087120 | A1 | | 4/2007 | Connors, Jr. et al. |
| 2007/0167534 | A1 | | 7/2007 | Coronado et al. |
| 2007/0208124 | A1 | | 9/2007 | Schiraldi et al. |
| 2007/0259169 | A1 | | 11/2007 | Williams et al. |
| 2008/0087870 | A1 | | 4/2008 | Williams et al. |

(Continued)

FOREIGN PATENT DOCUMENTS

| CN | 101525248 B | 7/2012 |
| DE | 1964188 A1 | 7/1970 |

(Continued)

OTHER PUBLICATIONS

Chaisuwan, T. et al., "Novel Carbon Aerogel Prepared from Benzoxazine Precursors via Ambient Drying: Effect of Amine Derivatives", PMSE Preprints, vol. 100, Spring 2009, 3 pages.
Chaisuwan, T. et al., "Removal of heavy metals from model wastewater by using polybenzoxazine aerogel", Desalination 256 (2010), pp. 108-114.
Katanyoota, P., et al., "Novel polybenzoxazine-based carbon aerogel electrode for supercapacitors," Materials Science and Engineering B, vol. 167, 2010, pp. 36-42.
Komalwanich, T. et al., "Removal of Heavy Metals from Wastewater by Polybenzoxazine-based Aerogel", PMSE Preprints, vol. 100, Spring 2009, 3 pages.
Yang, J. et al., "Compressive behaviors and morphological changes of resorcinol-formaldehyde aerogel at high strain rates", Microporous and Mesoporous Materials, vol. 133, 2010, pp. 134-140.
EP Search Report for Application No. 11158144.3 dated Jul. 29, 2011.
Hoepfner, S. et al., Synthesis and characterisation of nanofibrillar cellulose aerogels, Cellulose, 2008, vol. 15: 121-129.
Leventis, N. et al., Nanoengineering Strong Silica Aerogels, Nano Letters, 2002, vol. 2 (9): 957-960.

(Continued)

*Primary Examiner* — Irina S Zemel
(74) *Attorney, Agent, or Firm* — Cantor Colburn LLP

(57) ABSTRACT

An aerogel-foam composite includes an open cell foam and an aerogel matrix polymer disposed in the open cell foam. The aerogel-foam composite has compression strength of about 15 megaPascals (MPa) or more. The open cell foam may be a polyurethane foam including a carbonate group (—OC(O)O—).

35 Claims, 1 Drawing Sheet

(56) References Cited

U.S. PATENT DOCUMENTS

| | | | |
|---|---|---|---|
| 2008/0112876 | A1 | 5/2008 | Dailey |
| 2008/0188581 | A1 | 8/2008 | Lee et al. |
| 2008/0220333 | A1 | 9/2008 | Yano et al. |
| 2008/0287561 | A1 | 11/2008 | Menashi et al. |
| 2009/0029147 | A1 | 1/2009 | Tang et al. |
| 2009/0035344 | A1 | 2/2009 | Thomas et al. |
| 2010/0204347 | A1 | 8/2010 | Park et al. |
| 2010/0210810 | A1 | 8/2010 | Katagiri et al. |
| 2011/0071231 | A1 | 3/2011 | Park et al. |
| 2011/0105636 | A1 | 5/2011 | Kim et al. |
| 2011/0201713 | A1 | 8/2011 | Kim et al. |
| 2011/0237698 | A1 | 9/2011 | Park et al. |
| 2011/0245361 | A1 | 10/2011 | Kim et al. |
| 2011/0245362 | A1 | 10/2011 | Hwang et al. |
| 2011/0311802 | A1 | 12/2011 | Cho et al. |

FOREIGN PATENT DOCUMENTS

| | | | |
|---|---|---|---|
| EP | 0994912 | A | 1/1996 |
| EP | 0995773 | A2 | 4/2000 |
| JP | 4732742 | A | 11/1972 |
| JP | 05-319899 | A | 12/1993 |
| JP | 2000-119433 | A | 4/2000 |
| JP | 2008-132676 | A | 6/2008 |
| JP | 2008-221385 | A | 9/2008 |
| JP | 2008-231258 | A | 10/2008 |
| KR | 1996-7003975 | A | 8/1996 |
| KR | 1019990044531 | A | 6/1999 |
| KR | 10-0282964 | A | 12/2000 |
| KR | 10-0282964 | B1 | 12/2000 |
| KR | 1020010017538 | A | 3/2001 |
| KR | 1020040011915 | A | 2/2004 |
| KR | 1020040106289 | A | 12/2004 |
| KR | 1020050037557 | A | 4/2005 |
| KR | 1020050073500 | A | 7/2005 |
| KR | 1020050118119 | A | 12/2005 |
| KR | 1020060099514 | A | 9/2006 |
| KR | 10-0666110 | B1 | 1/2007 |
| KR | 1020090059321 | A | 6/2009 |
| KR | 1020090061301 | A | 6/2009 |
| KR | 10-0911845 | B | 8/2009 |
| WO | 96/26915 | A1 | 9/1996 |
| WO | WO2007/146945 | * | 12/2007 |
| WO | 2008/114524 | A1 | 9/2008 |
| WO | 2008104491 | A1 | 9/2008 |
| WO | 20091033070 | A1 | 3/2009 |

OTHER PUBLICATIONS

Pekala, R.W. "Organic aerogels from the polycondensation of resorcinol with formaldehyde", Journal of Materials Science, 1989, 24(9): 3221-3227.

European Extended Search Report—EP 10191930.6 dated May 11, 2011.

Husing, N. et al., "Aerogels-Airy materials: chemistry, structure, and properties" Angew. Chem. Int. Ed. 1998, 37, pp. 22-45.

Iler, R.K., the Chemistry of Silica: Solubility, Polymerization, Colloid and Surface Properties and Biochemistry of Silica, John Wiley & Sons, N.Y. (1978).

Leventis, N., Three-Dimensional Core-Shell Superstructures: Mechanically Strong Aerogels, Acc Chem Res., 2007; 40 (9): pp. 874-884. Epub May 9, 2007.

Pekala, R. W. et al., Structure of Organic Aerogels. 1. Morphology and Scaling, Macromolecules, 1993; 26(20): pp. 5487-5493.

Aaltonen, et al., The preparation of lignocellulosic aerogels from ionic liquid solutions, Carbohydrate Polymers, 2009, vol. 75: pp. 125-129.

Fischer et al., Cellulose-based aerogels, Polymer, 2006, vol. 47: pp. 7636-7645.

Gavillon et al., Aerocellulose: New Highly Porous Cellulose Prepared from Cellulose—NaOH Aqueous Solutions, Biomacromolecules, 2008, vol. 9: pp. 269-277 (2008).

Hebb et al., Synthesis of porous cross-linked polymer monoliths using 1,1,1,2-tetrafluoroethane (R134a) as the porogen, Composites Science and Technology, 2003, vol. 63: pp. 2379-2387.

Innerlohinger et al., Aerocellulose: Aerogels and Aerogel-like Materials made from Cellulose, Macromol. Symp., 2006, vol. 244: pp. 126-135.

Jin et al., Nanofibrillar cellulose aerogels, Colloids and Surfaces a: Physicochem. Eng. Aspects, 2004, vol. 240, pp. 63-67.

Liebner et al., Cellulose aerogels: highly porous, ultra-lightweight materials, 2008, Holzforschung, vol. 62: pp. 129-135.

Liebner et al., Cellulosic aerogels as ultra-lightweight materials. Part 2: synthesis and properties, Holzforschung, 2009, vol. 63: pp. 3-11.

Tan et al., Organic Aerogels with Very High Impact Strength, Advanced Materials, 2001, vol. 13, No. 9, pp. 644-646.

Capadona, L. A. et al., Flexible, Low-Density Polymer Crosslinked Silica Aerogels, Polymer, 2006; vol. 47: pp. 5754-5761.

Hüsing, N. et al., Airy Materials: Chemistry, Structure, and Properties, Angew Chem. Int. Ed. 1998, 37: pp. 23-45.

Kanamori, K. et al., New Transparent Methylsilsesquioxane Aerogels and Xerogels with Improved Mechanical Properties, Advanced Materials, 2007, vol. 19(12): pp. 1589-1593.

Katanyoota, P. et al., Novel polybenzoxazine-based carbon aerogel electrode for supercapacitors, Materials Science and Engineering: B, 2010, vol. 167(1): pp. 36-42.

Leventis, N. et al., Nanoengineering Strong Silica Aerogels, Nano Letters, 2002, vol. 2 (9): pp. 957-960.

Lorjai, P. et al., Porous structure of polybenzoxazine-based organic aerogel prepared by solgel process and their carbon aerogels, J. of Sol-Gel Science and Technology, 1992, vol. 52 (1): pp. 56-64.

Science Magazine, Editor's Choice Section, "Materials Science Spongy Clay?", 2005, vol. 310; 5747, pp. 407-408.

Al-Muhtaseb, S.A. et al., Preparation and Properties of Resorcinol-Formaldehyde Organic and Carbon Gels, Advanced Materials, 2003, 15, pp. 101-114.

Aoki, H. et al., Basic Study of the Gelation of Dimethacrylate-Type Crosslinking Agents, J. of Polymer Sci Part A: Polymer Chem, 2006, 44: pp. 949-958.

Chowdhury, R., Electron-Beam-Induced Crosslinking of Natural Rubber/Acrylonitrile-Butadiene Rubber Latex Blends in the Presence of Ethoxylated Pentaerythritol Tetraacrylate Used as a Crosslinking Promoter, J. of Applied Polymer Sci, 2007, vol. 103, No. 2: pp. 1206-1214.

Gu, W. et al., Polymerized Gels and 'Reverse Aerogels' from Methyl Methacrylate or Styrene and Tetraoctadecylammonium Bromide as Gelator, Chem. Commun. 1997, 6: pp. 543-544.

Kaczmarek, H. et al., Networks of Photocrosslinked Poly(meth)acrylates in Linear Poly(vinyl chloride), Networks of, J. Appl. Polym. Sci., 2002, 86: pp. 375-3734.

Mulik, S. et al, Cross-Linking 3D Assemblies of Nanoparticles into Mechanically Strong Aerogels by Surface-Initiated Free-Radical Polymerization, Chem. Mater., 2008, 20 (15): pp. 5035-5046.

Paguio, R.R. et al., Fabrication Capabilities for Spherical Foam Targets Used in ICF Experiments, 17th Target Fabrication Specialist Meeting, San Diego, CA, Oct. 1-5, 2006. Also published on IEEE Xplore.

Rozenberg, B.A. et al., High Performance Bismaleimide Matrices: Cure Kinetics and Mechanism, Polymers for Advanced Technology, 2002, 13: pp. 837-844.

Wiener, M. et al., Carbon Aerogel-Based High Temperature Thermal Insulation, Int J Thermophys, 2009, 30: pp. 1372-1385.

Long, D. et al., Molecular design of polymer precursors for controlling microstructure of organic and carbon aerogels, J. of Non-Crystalline Solids, 2009, 355: pp. 1252-1258.

Feldmann, C., Polyol-Mediated Synthesis of Nanoscale Functional Materials, Advanced Functional Materials, 2003, 13 (2): pp. 101-107.

Jirglova, H. et al., Synthesis and Properties of Phloroglucinol-Phenol-Formaldehyde Carbon Aerogels and Xerogels, Langmuir, 2009; 25(4): pp. 2461-2466.

Mulik, S. et al., Time-Efficient Acid-Catalyzed Synthesis of Resorcinol-Formaldehyde Aerogels, Chem. Mater. 2007, 19: pp. 6138-6144.

EP Extended Search Report for Application No. 11170821.0 dated Nov. 30, 2011.

* cited by examiner

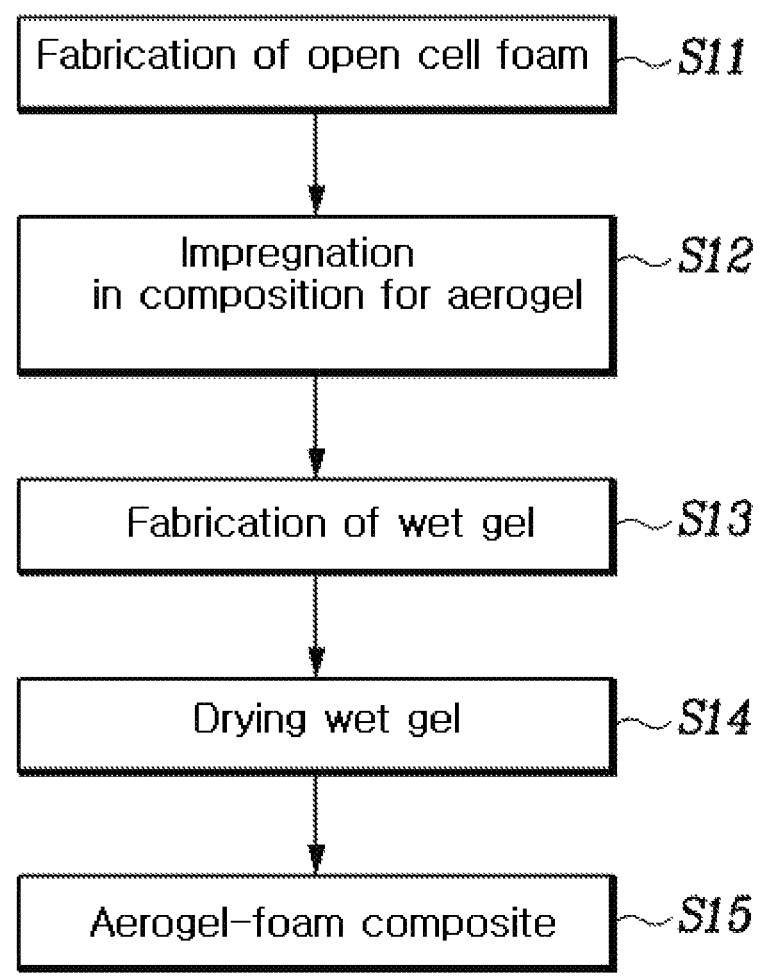

AEROGEL-FOAM COMPOSITES

CROSS-REFERENCE TO RELATED APPLICATION

This application is a continuation-in-part of, and claims priority to U.S. application Ser. No. 12/553,248, filed Sep. 3, 2009, which claims priority to Korean Patent Application No. 2009-0010967, filed Feb. 11, 2009; U.S. application Ser. No. 12/834,438, filed Jul. 12, 2010, which claims priority to Korean Patent Application No. 10-2009-0106641, filed Nov. 5, 2009; U.S. application Ser. No. 12/891,143, filed Sep. 27, 2010, which claims priority to Korean Patent Application No. 2010-0030136, filed Apr. 1, 2010; U.S. application Ser. No. 12/886,313, filed Sep. 20, 2010, which claims priority to Korean Patent Application No. 2009-0090718, filed Sep. 24, 2009; U.S. application Ser. No. 12/880,896, filed Sep. 13, 2010, which claims priority to Korean Patent Application No. 2010-013640, filed Feb. 12, 2010; U.S. application Ser. No. 12/982,148, filed Dec. 30, 2010, which claims priority to Korean Patent Application No. 2010-0028824, filed Mar. 30, 2010; U.S. application Ser. No. 13/072,137, filed Mar. 25, 2011, which claims priority to Korean Patent Application No. 2010-027602, filed Mar. 27, 2011; and this application claims priority to Korean Patent Application No. 10-2010-0058799, filed on Jun. 21, 2010, and all the benefits accruing therefrom under 35 U.S.C. §119. All of the foregoing applications are herein incorporated by reference in their entirety.

BACKGROUND

1. Field

This disclosure relates to an aerogel-foam composite.

2. Description of the Related Art

An aerogel is a microporous material having a nanometer-sized three-dimensional mesh structure. The aerogel may have adiabatic and sound absorption properties, and the aerogel may be useful in a variety of diverse applications. Particularly, an aerogel may be usefully applied to a cooling device, such as a refrigerator and a freezer, and may be used as an adiabatic material in aerospace applications, and for building construction.

Aerogels may be categorized as an inorganic aerogel or an organic aerogel according to the material. An example of an inorganic aerogel is a silica aerogel. An organic aerogel includes an organic linking group therein, and thus may be more flexible than an inorganic aerogel.

In general, an aerogel fabricated in the form of a monolith, film, or particle has high brittleness and may be collapsed by a small impact.

Accordingly, there remains a need for an improved aerogel material.

SUMMARY

An embodiment of this disclosure provides an aerogel-foam composite having excellent mechanical properties and flexibility.

Another embodiment of this disclosure provides a method of manufacturing the aerogel-foam composite.

According to an embodiment of this disclosure, an aerogel-foam composite including an open cell foam; and an aerogel matrix polymer disposed in the open cell foam is provided, wherein the aerogel-foam composite has compression strength of about 15 megaPascals (MPa) or more, and specifically about 19 MPa or more.

The open cell foam may have porosity of about 90% or more, and may include a polymer selected from polyurethane, polyvinylchloride, polycarbonate, polyester, polymethyl(meth)acrylate, polyurea, polyether, polyisocyanurate, or a combination thereof.

The open cell foam may include a polyurethane foam comprising a carbonate group or include a first structural unit comprising a carbonate group, a second structural unit comprising a urethane group, and a third structural unit comprising a urea group. The polymer may include a structural unit comprising a carbonate group in an amount of about 5 to about 30 weight percent.

The aerogel-foam composite may have thermal conductivity of about 25 mW/mK or less. The aerogel matrix polymer includes a first polymer, a second polymer, a third polymer, a fourth polymer, a fifth polymer, a sixth polymer, a seventh polymer, an eighth polymer, or a combination thereof, wherein the first polymer is a polymerization product of a first aryl compound having at least one hydroxy groups, a first aldehyde compound, and a polyol compound;

the second polymer is a polymerization product of a substituted or unsubstituted bis(meth)acrylamide, a substituted or unsubstituted tris(meth)acrylamide, or a combination thereof;

the third polymer is a cross-linked product of a substituted or unsubstituted alkyl cellulose compound and a substituted or unsubstituted diisocyanate compound;

the fourth polymer is a benzoxazine polymerization product of a second aryl compound including at least two hydroxyl groups, an amine compound including at least two amine groups, and a second aldehyde compound;

the fifth polymer is a polymerization product of a third aryl compound including at least two hydroxy groups and at least two aryl groups linked to each other by a linker, a fourth aryl compound including at least two hydroxy groups and at least two aryl groups fused to each other, or a combination thereof, and a hydroxyl substituted benzene, and a third aldehyde compound;

the sixth polymer is a polymerization product of a substituted or unsubstituted maleimide compound, and a compound having at least two double bonds reactive with the substituted or unsubstituted maleimide compound;

the seventh polymer is a polymerization product of an aromatic compound including at least two unsaturated functional groups, and a monomer including at least two (meth)acryloyl groups reactive with the at least two unsaturated functional groups; and optionally the eighth polymer is a polymerization product of a second hydroxyl substituted benzene, and an fourth aldehyde compound.

According to another embodiment of this disclosure, an aerogel-foam composite is provided that includes an open cell foam and an aerogel matrix disposed in the open cell foam, wherein the open cell foam is a polyurethane foam including a carbonate group (—OC(O)O—).

Also disclosed is a method of preparing an aerogel foam composite, the method including:

providing an open cell foam;

disposing a composition for an aerogel matrix polymer in the open cell foam;

polymerizing the composition for the aerogel matrix polymer to prepare a wet gel; and drying the gel, wherein the aerogel matrix polymer includes a first polymer, a second polymer, a third polymer, a fourth polymer, a fifth polymer, a sixth polymer, a seventh polymer, and optionally an eighth polymer, or a combination thereof, wherein the first polymer is a polymerization product of
a first aryl compound including at least one hydroxy groups,
a first aldehyde compound, and
a polyol compound;

the second polymer is a polymerization product of a substituted or unsubstituted bis(meth)acrylamide, a substituted or unsubstituted tris(meth)acrylamide, or a combination thereof;

the third polymer is a crosslinked product of a substituted or unsubstituted alkyl cellulose compound and a substituted or unsubstituted diisocyanate compound;

the fourth polymer is a polybenzoxazine polymerization product of
a second aryl compound including at least two hydroxyl groups,
an amine compound including at least two amine groups, and
a second aldehyde compound;

the fifth polymer is a polymerization product of
a third aryl compound including at least two hydroxy groups and at least two aryl groups linked to each other by a linker,
a fourth aryl compound including at least two hydroxy groups and at least two aryl groups fused to each other, or a combination thereof,
a hydroxyl-substituted benzene, and
a third aldehyde compound;

the sixth polymer is a polymerization product of
a substituted or unsubstituted maleimide compound, and
a compound having at least two double bonds reactive with the substituted or unsubstituted maleimide compound;

the seventh polymer is a polymerization product of
an aromatic compound including at least two unsaturated functional groups, and
a monomer including at least two (meth)acryloyl groups reactive with the at least two unsaturated functional groups; and optionally the eighth polymer is a polymerization product of
a second hydroxyl substituted benzene, and
a fourth aldehyde compound.

BRIEF DESCRIPTION OF THE DRAWING

The above and other embodiments, advantages and features of this disclosure will become more apparent by describing in further detail exemplary embodiments thereof with reference to the accompanying drawings, in which:

FIG. 1 is a drawing showing an embodiment of a process of making an aerogel.

DETAILED DESCRIPTION

This disclosure will be described more fully hereinafter in the following detailed description, and with reference to the accompanying drawings, in which some but not all embodiments of the disclosure are disclosed. This disclosure may, however, be embodied in many different forms and is not to be construed as limited to the exemplary embodiments set forth herein; rather, these embodiments are provided so that this disclosure will be thorough and complete, and will fully convey the scope of the invention to those skilled in the art. Like reference numerals and variables refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes," and/or "including" when used in this specification, specify the presence of stated features, regions, integers, steps, operations, elements, and/or components, but do not preclude the presence or addition of one or more other features, regions, integers, steps, operations, elements, components and/or groups thereof.

Unless otherwise defined, all terms (including technical and scientific terms) used herein have the same meaning as commonly understood by one of ordinary skill in the art to which this invention belongs.

As used herein, "substituted" indicates replacement of one or more hydrogens (e.g., 1, 2, 3, 4, 5, or 6 hydrogens) in a compound with one or more substituents (e.g., 1 to 4 substituents) independently selected from a C1 to C30 alkyl group, a C2 to C30 alkynyl group, a C6 to C30 aryl group, a C7 to C30 alkylaryl group (e.g., a 4-methylphenylene), a C1 to C4 alkoxy group (e.g., an —OCH$_3$ group), a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (F, Cl, Br, or I), a hydroxyl group (—OH), a C1 to C15 alkoxy group, a nitro group (—NO$_2$), a cyano group (—CN), an amino group (—NH$_2$), an azido group (—N$_3$), an amidino group (—C(=NH)NH$_2$), a hydrazino group (—NHNH$_2$), a hydrazono group (=N(NH$_2$)), an aldehyde group (—C(=O)H), a carbamoyl group (—C(O)NH$_2$), a thiol group (—SH), a carboxylic C1 to C6 alkyl ester group (—C(=O)OR wherein R is a C1 to C6 alkyl group), a carboxyl group (—C(=O)OH), a carboxylic acid salt (—C(=O)OM) wherein M is an organic or inorganic cation, a sulfonic acid group (—SO$_3$H), a sulfonic monobasic salt (—SO$_3$M wherein M is an organic or inorganic cation), a phosphonic acid group (—PO$_3$H$_2$), a phosphonic acid mono- or dibasic salt (—PO$_3$MH or —PO$_3$M$_2$ wherein M is an organic or inorganic cation), or a combination thereof, instead of hydrogen atom.

"Hydrocarbon" means an organic compound having at least one carbon atom and at least one hydrogen atom, optionally substituted with one or more substituents where indicated.

"Alkyl" means a straight or branched chain saturated aliphatic hydrocarbon having the specified number of carbon atoms and having a valence of one, optionally substituted with one or more substituents where indicated. Unless otherwise provided, the term "alkyl" refers to a C1 to C30 linear or branched alkyl group.

"Alkylene" means a straight, or branched chain saturated aliphatic hydrocarbon group having a valence of two or more, optionally substituted with one or more substituents where indicated, (e.g., methylene (—CH$_2$—) or, propylene (—(CH$_2$)$_3$—)). Unless otherwise provided, the term "alkylene group" refers to a C1 to 030 linear or branched alkylene group.

"Alkenyl" means a straight or branched chain hydrocarbon group that comprises at least one carbon-carbon double bond and having a valence of one, optionally substituted with one or more substituents where indicated.

"Alkenylene" means a straight or branched chain, hydrocarbon group having a valence of two or more, optionally substituted with one or more substituents where indicated, and having at least one carbon-carbon double bond (e.g., ethenylene (—HC=CH—)).

"Alkynyl" means a straight or branched chain hydrocarbon group having at least one carbon-carbon triple bond (e.g., ethynyl), having the specified number of carbon atoms, and having a valence of one, optionally substituted with one or more substituents where indicated.

"Alkynylene" means a straight or branched chain aliphatic hydrocarbon having a valence of two or more, optionally substituted with one or more substituents where indicated, that has one or more unsaturated carbon-carbon bonds, at least one of which is a triple bond (e.g., ethynylene).

"Aryl" means a cyclic group in which all ring members are carbon and at least one ring is aromatic, the group having the specified number of carbon atoms, optionally substituted with one or more substituents where indicated, and having a valence of one, provided that the valence of the aryl group is not exceeded. More than one ring may be present, and any additional rings may be independently aromatic, saturated or partially unsaturated and multiple rings, if present, may be fused, pendant, spirocyclic or a combination thereof. Unless otherwise provided, the term "aryl" refers to a C6 to C40 aryl group.

"Arylene" means a group having a valence of two or more, formed by the removal of one or more hydrogen atoms from one or more rings of an aryl group, and optionally substituted with one or more substituents where indicated, wherein the hydrogen atoms may be removed from the same or different rings (e.g., phenylene or naphthylene).

"Alkylaryl" means an alkyl group covalently linked to a substituted or unsubstituted aryl group that is linked to a compound, optionally substituted with one or more substituents where indicated, and having a valence of one.

"Alkylarylene" means an alkyl group covalently linked to a substituted or unsubstituted divalent aryl group that is linked to a compound, optionally substituted with one or more substituents where indicated.

"Arylalkyl" means an aryl group covalently linked to an alkyl group that is linked to a compound (e.g., a benzyl is a C7 arylalkyl group), optionally substituted with one or more substituents where indicated, and having a valence of one. "Arylalkylene" means an aryl group covalently linked to an alkylene group that is linked to a compound optionally substituted with one or more substituents where indicated.

"Arylalkylenearyl" means an aryl group covalently linked to an alkylene group that is covalently linked to an aryl group that is linked to a compound, optionally substituted with one or more substituents where indicated, and having a valence of one.

"Arylalkylenearylenealkylene" means an aryl group covalently linked to an alkylene group that is covalently linked to an arylene group that is covalently linked to an alkylene group that is covalently linked to a compound, optionally substituted with one or more substituents where indicated, and having a valence of two or more.

"Cycloalkyl" means a group that comprises one or more saturated rings in which all ring members are carbon, such as cyclopropyl, cyclobutyl, cyclopentyl, cyclohexyl, cycloheptyl, cyclooctyl, adamantyl and having a valence of one, and optionally substituted with one or more substituents where indicated. Cycloalkyl groups do not include an aromatic ring or a heterocyclic ring. When the numbers of carbon atoms is specified (e.g., C3 to C15 cycloalkyl), the number means the number of ring members present in the one or more rings.

"Cycloalkenyl" means a group having one or more rings and one or more carbon-carbon double bond in the ring, wherein all ring members are carbon (e.g., cyclopentenyl and cyclohexenyl), and optionally substituted with one or more substituents where indicated.

"Cycloalkynyl" means a stable aliphatic monocyclic or polycyclic group having at least one carbon-carbon triple bond, wherein all ring members are carbon (e.g., cyclohexynyl), and optionally substituted with one or more substituents where indicated, and having one valence.

"Cycloalkylene" means a group having a valence of at least two formed by the removal of one or more hydrogen atom from one or more rings of a cycloalkyl group and optionally substituted with one or more substituents where indicated.

"Cycloalkenylene" means a stable aliphatic monocyclic or polycyclic group having a valence of at least two, and having at least one carbon-carbon double bond, which comprises one or more rings connected or bridged together, and optionally substituted with one or more substituents where indicated. Unless indicated otherwise, the cycloalkenylene radical can be linked at any desired carbon atom provided that a stable structure is obtained. If the cycloalkenylene radical is substituted, this may be so at any carbon atom, once again provided that a stable structure is obtained. Examples thereof are cyclopentenylene, cyclohexenylene, cycloheptenylene, cyclooctenylene, cyclononenylene, cyclodecenylene, norbornenylene, 2-methylcyclopentenylene, 2-methylcyclooctenylene.

"Cycloalkynylene" means a stable monocyclic or polycyclic group having a valence of at least two and at least one carbon-carbon triple bond which may comprise one or more fused or bridged ring(s), and optionally substituted with one or more substituents where indicated. Representative cycloalkynylene groups include cyclooctynylene, cyclononynylene, cyclodecynylene, 2-methylcyclooctynylene, and the like.

When a definition is not otherwise provided, the term "amino group" refers to a group having the general formula —NR'R", wherein, unless otherwise provided, R' and R" are each independently hydrogen, a C1 to C30 alkyl group, a C3 to C30 cycloalkyl group, a C2 to C30 heterocycloalkyl group, a C6 to C30 aryl group, or a C2 to C30 heteroaryl group.

"Amide" group means a group of the formula —C(O)—N(Rx)(Ry) or —N(Ry)—C(O)—Rx, wherein Rx is an C1 to C10 alkyl, a C2-C10 alkenyl, a C2 to C10 alkynyl, a C3 to C8 cycloalkyl, or a C6 to C12 aryl group; and Ry is hydrogen or any of the groups listed for Rx.

"Alkoxy" means an alkyl group that is linked via an oxygen (i.e., alkyl-O—), for example methoxy, ethoxy, and sec-butyloxy groups.

The prefix "hetero" means that the group or compound includes at least one ring member that is a heteroatom or a heteroatom-containing group (e.g., 1 to 3 heteroatoms) each being independently selected from N, O, S, P, or $SiR^aR^bR^a$ and $R^b$.

"Polyol" means a compound having two or more than two hydroxyl groups. Examples of polyols include ethylene glycol, propylene glycol, and 1,6-hexanediol.

As used herein, "a combination thereof" refers to a combination comprising at least two of the named constituents, components, compounds, or elements, optionally together with one or more of the same class of constituents, components, compounds, or elements.

The symbol "*" represents a point of connection to another group.

An "aerogel" may include an ambigel (i.e., an ambiently-dried aerogel), a xerogel, a cryogel, and the like.

A (meth)acrylate group is inclusive of an acrylate ($H_2C=CH—C(=O)O—$) group or a methacrylate group ($H_2C=C(CH_3)—C(=O)O—$), a (meth)acryloyl group is inclusive of an acryloyl group ($H_2C=CH—C(=O)—$) or a methacryloyl group ($H_2C=C(CH_3)—C(=O)—$), and N-(meth)acrylamido is inclusive of an N-acrylamido ($H_2C=CH—C(=O)N(R_x)—$) and N-methacrylamido group ((H₂C=C(CH₃)—C(=O)—N(R$_x$)—) wherein R$_x$ is a C1 to C10 alkyl or a C6 to C12 aryl group. Hereinafter, an aerogel-foam composite according to an embodiment is disclosed.

According to an embodiment, an aerogel-foam composite comprises an open cell foam and an aerogel matrix polymer disposed in the open cell foam. The aerogel-foam composite has compression strength of about 15 megaPascals (MPa) or more, specifically about 19 MPa or more, more specifically about 15 to about 80 MPa, and still more specifically about 30 MPa or more.

As used herein, the term "compression strength" may refer to an applied strength when an aerogel-foam composite is compressed by 10%, vertically or horizontally. The compression may be measured according to ASTM D-1621, JIS A-9514, or KS M-3809.

The aerogel-foam composite may have an average pore size ranging from about 1 to about 500 nanometers (nm), specifically 2 to about 250 nm, more specifically 4 to about 125 nm, or about 1 to about 50 nm, and may have porosity ranging from about 80 to about 99%, specifically about 90 to about 96%, more specifically about 92 to about 94%, based on a total volume of the aerogel-foam composite. The aerogel-foam composite may have a specific surface area of about 400 square meters per gram (m²/g) or more, specifically about 200 to about 800 m²/g, more specifically about 250 to about 750 m²/g, or about 300 to about 700 m²/g. The aerogel-foam composite may have density of about 0.3 grams per cubic centimeter (g/cm³) or less, specifically about 0.05 to about 0.25 g/cm³, more specifically about 0.1 to about 0.20 g/cm³. In addition, the aerogel-foam composite may have a linear shrinkage of about 25% or less, specifically about 1 to about 20%, more specifically about 2 to about 15%, based on the total volume of a wet gel.

While not wanting to be bound by theory, it is believed that the aerogel-foam composite comprising the aerogel matrix polymer disposed in the open cell foam may maintain a selected pore size, and may provide a high specific surface area and adiabatic properties due to the desirable mechanical properties and flexibility, may substantially or effectively prevent collapse of the pores during their fabrication process.

The polymer aerogel matrix may comprise a first polymer which is a polymerization product of a first monomer which is a first aryl compound comprising at least one hydroxy groups, a second monomer which is an aldehyde compound, and a third monomer which is a polyol compound; a second polymer which is a polymerization product of a monomer comprising a substituted or unsubstituted bis(meth)acrylamide, a substituted or unsubstituted tris(meth)acrylimide, or a combination thereof; a third polymer which is a cross-linked product of a substituted or unsubstituted alkyl cellulose compound and a substituted or unsubstituted diisocyanate compound, for example a substituted or unsubstituted alkylenediphenyl diisocyanate compound; a fourth polymer which is a benzoxazine moiety-containing polybenzoxazine polymerization product of a second aryl compound comprising at least two hydroxy groups, an amine compound comprising at least two amine groups, and a second aldehyde compound; a fifth polymer which is a polymerization product of a first monomer comprising a third aryl compound comprising at least two hydroxy groups and at least two aryl groups linked to each other by a linker, a fourth aryl compound comprising at least two hydroxy groups and at least two aryl groups fused to each other, or a combination thereof, a second monomer comprising a hydroxyl substituted benzene, and a third aldehyde compound; a sixth polymer which is a polymerization product of a substituted or unsubstituted maleimide compound and a compound having at least two double bonds reactive with the substituted or unsubstituted maleimide compound; a seventh polymer which is a polymerization product of a first monomer comprising an aromatic compound comprising at least two unsaturated functional groups and a monomer including at least two (meth)acryloyl groups reactive with the at least two unsaturated functional groups.

The open cell foam comprises three-dimensionally connected cells. The cells may have a pore size (e.g., an average largest pore dimension) of about 1 to about 1000 micrometers (μm), specifically about 100 to about 1000 μm, more specifically about 150 to about 300 μm, or about 400 micrometers or less. The cells may have porosity about 90% or more, specifically about 80 to about 98%, more specifically about 90 to about 96%. The open cell foam may have density of about 0.03 grams per cubic centimeter (g/cm³) or less, specifically about 0.03 to about 0.001 g/cm³, more specifically about 0.01 to about 0.002 g/cm³, or about 0.01 to about 0.001 g/cm³. When the open cell foam has porosity and density within the foregoing range, a mechanical strength and a flexibility of the aerogel-foam composite may be suitable for a desired application.

The open cell foam comprises a polymer. The polymer can be a polyolefin, such as a homopolymer or a copolymer of a monoolefin or a diolefin, for example polypropylene ("PP"), or polyethylene ("PE") which optionally can be crosslinked and can be, for example, high density polyethylene ("HDPE"), low density polyethylene ("LDPE"), linear low density polyethylene ("LLDPE"), branched low density polyethylene ("BLDPE"), a polymer of a cycloolefin ("COG"), for example of cyclopentene or norbornene, a polystyrene such as high-impact polystyrene ("HIPS");

a polymer derived from an α,β-unsaturated acid which is obtained by polymerizing the unsaturated bond in positions α and β relative to the acid functionality, such as a polyacrylate, a polymethacrylate, a polyacrylonitrile, a polyacrylamide, or a polymethyl methacrylate impact-modified with a butyl acrylate polyamide;

a polymer derived from an unsaturated alcohol and an amine or an acyl derivatives or acetal thereof, such as polyvinyl alcohol, polyvinyl acetate, polyvinyl stearate, polyvinyl benzoate, polyvinyl maleate, polyvinyl butyral, polyallyl phthalate or polyallylmelamine, a polyurea, a polyimide, a polyamide-imide, or polybenzimidazole;

a polyester, i.e. polymerization product of a dicarboxylic acid such phthalic acid, isophthalic acid, or terephthalic acid and a difunctional or polyfunctional alcohol such as ethylene glycol, propylene glycol, or other diol or polyol derived from an alkane, such as polyethyleneterephthalate ("PET") or polybutylene terephthalate ("PBT"), poly-1,4-dimethylolcyclohexane terephthalate, or a polyhydroxybenzoate;

a polyamide ("PA") or a copolyamide derived from a diamine and a dicarboxylic and/or polycarboxylic acid and/or from an aminocarboxylic acid or the corresponding lactam, such as polyamide 4, 6, 6/6, 6/10, 6/9, 6/12, 4/6, 12/12, 11, or 12, an aromatic polyamide starting from m-xylene, diamine, and adipic acid; or a polyamide prepared from hexamethylenediamine and isophthalic and/or terephthalic acid without an elastomer as modifier, for example poly-2,4,4-trimethylhexamethylene terephthalamide or poly-m-phenylene isophthalamide;

a polycarbonate;

a polyurethane ("PUR") derived from a hydroxyl-terminated polyether and/or polyester and an aliphatic or aromatic polyisocyanate, and also precursors thereof;

a polyether, i.e. a polymerization product of a cyclic ether, such as a polyalkylene glycol, a polyethylene oxide, a polypropylene oxide ("PPO"), a polyacetal, or a polyethersulfone, a halogen-containing polymer, such as polychloroprene, chlorinated rubber, chlorinated or sulphochlorinated polyethylene, a copolymer of ethylene and chlorinated ethylene, an epichlorohydrin homopolymer or a polymer of a halogen-containing vinyl compound, for example polyvinyl chloride ("PVC"), polyvinylidene chloride, polyvinyl fluoride, or polyvinylidene fluoride;

a silicone; or a natural polymer such as cellulose, a gelatin and derivative thereof which has been chemically modified in a polymer-homologous manner, such as a cellulose acetate, a cellulose propionate, or a cellulose butyrate, or a cellulose ether, such as methylcellulose or a rosin.

A combination comprising at least two of the foregoing polymers can be used.

In an embodiment, the open cell foam may comprise polyurethane, polyvinylchloride, polycarbonate, polyester, polymethyl(meth)acrylate, polyurea, polyether, polyisocyanurate, or a combination thereof.

The open cell foam may be fabricated by polymerizing monomers in the presence of a foaming agent. Alternatively, a commercially available open cell foam may be used. For example, a polyurethane foam may be fabricated by contacting a polyol and an isocyanate group-containing monomer in the presence of a foaming agent.

The foaming agent is not particularly limited, and can include inorganic foaming agents and organic foaming agents. Representative examples of inorganic foaming agents include ammonium carbonate, ammonium hydrogen carbonate, sodium-hydrogen carbonate, ammonium nitrite, sodium borohydride, an azide, and water. Representative examples of organic foaming agents include chlorofluoro-alkane compounds such as trichloromonofluoromethane and dichloromonofluoromethane; azo compounds such as azobisisobutyronitrile, azodicarbonamide, and barium azodicarboxylate; hydrazine compounds such as p-toluenesulfonyl hydrazide, diphenylsulfone-3,3'-disulfonyl hydrazide, 4,4'-oxybis(benzenesulfonyl hydrazide), and allylbis(sulfonyl hydrazide); semicarbazide compounds such as p-toluoylenesulfonyl semicarbazide and 4,4'-oxybis(benzenesulfonyl semicarbazide); triazole compounds such as 5-morpholyl-1,2,3,4-thiatriazole; N-nitroso compounds such as N,N'-dinitrosopentamethylenetetramine and N,N'-dimethyl-N,N'-dinitrosoterephthalamide.

The foaming agent may be a heat-expandable microsphere. The heat-expandable microsphere may comprise a foaming agent encapsulated in a microcapsule. Examples of such heat-expandable microspheres include a microsphere including an elastic shell and a material that easily gasifies and expands by heating, such as isobutane, propane, or pentane, and is encapsulated by the shell. The shell may comprise a hot-melt material or a material that can break as a result of thermal expansion. Examples of the material constituting the shell include a vinylidene chloride-acrylonitrile copolymer, poly(vinyl alcohol), poly(vinyl butyral), poly(methyl methacrylate), polyacrylonitrile, poly(vinylidene chloride), or polysulfone. Such heat-expandable microspheres can be prepared according to a common procedure such as coacervation or interfacial polymerization, without undue experimentation. Such heat-expandable microspheres are also commercially available as products, such as products supplied from Matsumoto Yushi-Seiyaku Co., Ltd. under the trade name of "Matsumoto Microsphere."

A combination comprising at least two-of the foregoing foaming agents can be used.

The open cell foam may be a polyurethane foam including a carbonate group (—OC(O)O—). The open cell foam may be fabricated using a polymer comprising a first structural unit including a carbonate group (—OC(O)O—), a second structural unit including an urethane group (—OC(O)NH—), and a third structural unit including an urea group (—NH(C(O))NH—). The polymer of the open cell foam may include the structural unit including a carbonate group (—OC(O)O—) in an amount of about 5 to about 30 wt %, specifically about 7 to about 28 wt %, more specifically about 9 to about 26 wt %, based on a total weight of the polymer of the open cell foam. In an embodiment, the polymer of the open cell foam may include the structural unit including a carbonate group (—OC(O)O—) in an amount of about 10 to about 20 wt %. When the structural unit including the carbonate group is included within the foregoing range, the mechanical strength of the open cell foam may be improved and it is easier to fabricate the open cell foam.

The open cell polyurethane foam may be fabricated by contacting a carbonate group-containing polyol and an isocyanate group-containing monomer in the presence of the foaming agent.

With respect to the aerogel matrix polymer, the first polymer is the polymerization product of a first aryl compound having at least one hydroxy groups, a first aldehyde compound, and a polyol compound, and may include a structural unit represented by the following Chemical Formula 1A.

Chemical Formula 1A

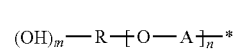

In Chemical Formula 1A,

R is a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C2 to C20 heteroarylene group, each A is independently a structural unit represented by the following Chemical Formula 1B, x is 2 to 10, specifically 0 to 5, more specifically 1 to 4, m is 0 to 10, specifically 0 to 5, more specifically 0 to 4, and n is an integer ranging from 2 to 10, specifically 2 to 8, more specifically 3 to 6.

Chemical Formula 1B

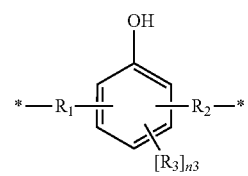

In Chemical Formula 1B, $R_1$ and $R_2$ are each independently a single bond, a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C2 to C20 heteroarylene group, each $R_3$ is independently hydrogen, a hydroxyl group, a substituted or unsubstituted C1 to C20 alkoxy group, or a substituted or unsubstituted amino group, and $n_3$ is an integer ranging from 0 to 3.

In a specific embodiment, each $R_2$ is independently a C6 to C20 arylene group optionally substituted with a hydroxyl group, a substituted or unsubstituted C1 to C20 alkoxy group, or a substituted or unsubstituted amino group, or each $R_2$ is independently C2 to C20 heteroarylene group optionally substituted with a hydroxyl group, a substituted or unsubstituted C1 to C20 alkoxy group, or a substituted or unsubstituted amino group.

In the structural unit represented by the Chemical Formula 1A, the R—O moiety may be derived from polymerization of the polyol compound, wherein the polyol compound is a compound comprising two or more hydroxyl groups, and in an embodiment, the polyol compound may be represented by the following Chemical Formula 1C.

   Chemical Formula 1C

In Chemical Formula 1C, $R_9$ is a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C2 to C20 heteroarylene group, and $n_9$ is an integer ranging from 2 to 10, specifically 2 to 8, more specifically 3 to 6.

In Chemical Formula 1C, the hydroxyl groups may be connected to the same or different carbons of $R_9$.

Examples of the polyol compound of Chemical Formula 1C may include compounds of the following Chemical Formula 1C-1.

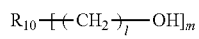   Chemical Formula 1C-1

In Chemical Formula 1C-1, $R_{10}$ is a substituted or unsubstituted C1 to C20 alkylene group, a substituted or unsubstituted C1 to C20 ether group, a substituted or unsubstituted C3 to C20 cycloalkylene group, a substituted or unsubstituted C6 to C20 arylene group, or an isocyanurate group, l is an integer ranging from 0 to 10, specifically 1 to 8, and m is an integer ranging from 2 to 10, specifically 2 to 8, more specifically 3 to 6.

In an embodiment, $R_{10}$ is a substituted or unsubstituted C1 to C10 alkylene group, e.g., optionally substituted with up to 5 hydroxyl groups, a substituted or unsubstituted C1 to C20 ether group, a substituted or unsubstituted C3 to C8 cycloalkyl group, e.g., optionally substituted with up to 3 hydroxyl groups, a substituted or unsubstituted C6 to C20 aryl group, or an isocyanurate group.

Examples of the polyol compound of Chemical Formula 1C include the following Chemical Formulas 1C-2 to 1C-8.

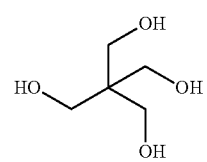

Chemical Formula 1C-2

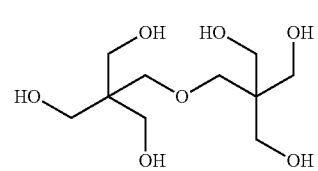

Chemical Formula 1C-3

Chemical Formula 1C-4

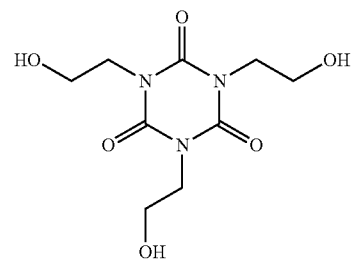

Chemical Formula 1C-5

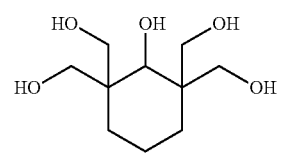

Chemical Formula 1C-6

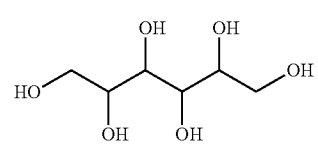

Chemical Formula 1C-7

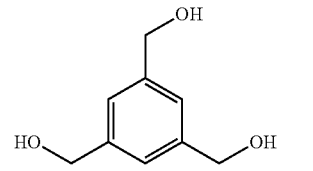

Chemical Formula 1C-8

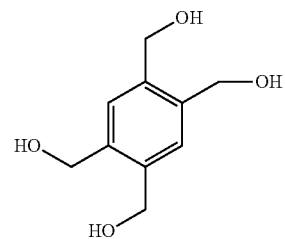

The structural unit of the first polymer obtained from the polymerization of the polyol compound, the first aryl compound comprising at least one hydroxy group, and the first aldehyde compound represented by the above Chemical Formula 1A may include the following Chemical Formula 1A-1.

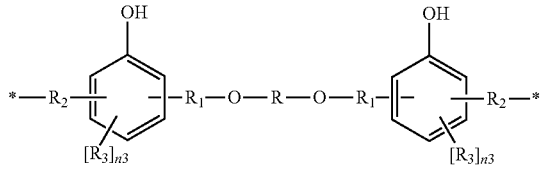

Chemical Formula 1A-1

In Chemical Formula 1A-1,

R, $R_1$, $R_2$, $R_3$ and $n_3$ are the same as defined in the above Chemical Formulae 1A and 1B.

The structural unit represented by the above Chemical Formula 1A-1 corresponds to a structure wherein n is 2 and m is 0 in Chemical Formula 1A. While not wanting to be bound by theory, it is believed that excellent mechanical strength and flexibility may be obtained by including a new linking group (—$R_1$—O—R—O—$R_1$—) between the aryl units of Chemical Formula 1A-1.

Examples of the first aryl compound comprising at least one hydroxy group include pyrocatechol, resorcinol, phloroglucinol, 1,3-naphthalenediol, 1,4,5,8-naphthalenetetrol, or a combination thereof.

Examples of the first aldehyde compound include formaldehyde, furfural, paraformaldehyde, trioxymethylene, acetaldehyde, butyraldehyde, acrolein, furylacrolein, crotonaldehyde, glyoxal, benzaldehyde, or a combination thereof. The first aldehyde compound gives rise to $R_1$ and $R_2$ in the above formulae 1B and 1A-1.

The first polymer may further optionally include a structural unit represented by the following Chemical Formula 1D.

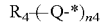     Chemical Formula 1D

In Chemical Formula 1D, $R_4$ is a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C2 to C20 heteroarylene group, each Q is independently a structural unit represented by the following Chemical Formula 1E, and $n_4$ is an integer ranging from 2 to 4.

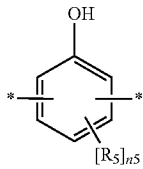     Chemical Formula 1E

In Chemical Formula 1E, each $R_5$ is independently hydrogen, a hydroxyl group, a substituted or unsubstituted C1 to C20 alkoxy group, or a substituted or unsubstituted amino group, and $n_5$ is an integer ranging from 0 to 3.

An example of a monomer that can be included to provide a unit of formula 10 is bisphenol A. Units of formula 1D may be connected to the polymers of formulas 1A and 1A-1 by units of Formulae $R_1$ and/or $R_2$ as described in Formulae 1B and 1-A1.

The first polymer may further optionally include a structural unit represented by the following Chemical Formula 1F.

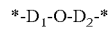     Chemical Formula 1F

In Chemical Formula 1F, $D_1$ and $D_2$ are each independently hydrogen, or are a structural unit represented by the following Chemical Formula 1G, provided that $D_1$ and $D_2$ are not both hydrogen at the same time.

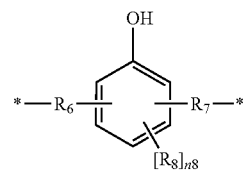     Chemical Formula 1G

In Chemical Formula 1G, $R_6$ and $R_7$ are each independently a single bond, a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C2 to C20 heteroarylene group, for example a substituted or unsubstituted C4 to C20 heteroarylene group, each $R_8$ is independently hydrogen, a hydroxyl group, a substituted or unsubstituted C1 to C20 alkoxy group, or a substituted or unsubstituted amino group, and $n_8$ is an integer ranging from 0 to 3, and $x_1$ and $x_2$ are each independently integers from 0 to 1. The structural unit represented by Chemical Formula 1F can be derived from p-hydroxy diphenyl ether, for example.

In a method for preparing the first polymer, the polyol compound may be included in an amount of about 0.05 to about 30 wt %, specifically about 0.1 to about 20 wt %, more specifically about 1 to about 10 wt %, based on the total weight of the first aryl compound comprising at least one hydroxy groups, the first aldehyde compound, and the polyol compound. When the polyol compound is included within the foregoing range, an organic aerogel having excellent mechanical strength and flexibility may be obtained. The aldehyde compound for preparing the first polymer may be used in a molar excess based on 1 mole of the first aryl compound comprising at least one hydroxyl groups.

The monomer for preparing the second polymer may include a substituted or unsubstituted bis(meth)acrylamide compound, a substituted or unsubstituted tris(meth)acrylamide compound, or a combination thereof.

The monomer for preparing the second polymer may include a monomer independently represented by the following Chemical Formulae 2A to 2E, or a combination of the monomers 2A to 2E may be used.

Chemical Formula 2A

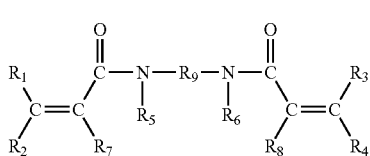

In Chemical Formula 2A, $R_1$ to $R_8$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, and $R_9$ is a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C13 to C30 arylalkylenearylenealkylene group, a substituted or unsubstituted C1 to C30 heteroalkylene group, a substituted or unsubstituted C2 to C30 heterocycloalkylene group, or a substituted or unsubstituted C2 to C30 alkenylene group. A combination of monomers comprising different $R_9$ groups can be used.

Chemical Formula 2B

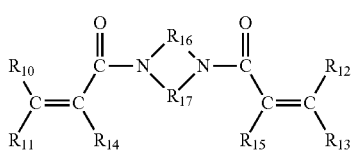

In Chemical Formula 2B, $R_{10}$ to $R_{15}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, and $R_{16}$ and $R_{17}$ are each independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, or a substituted or unsubstituted C2 to C30 alkenylene group.

Chemical Formula 2C

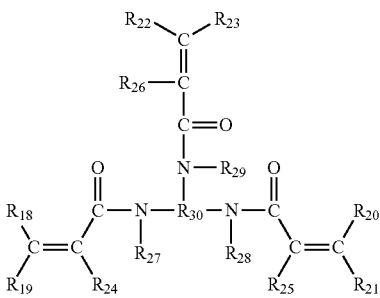

In Chemical Formula 2C, $R_{18}$ to $R_{29}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, and $R_{30}$ is a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, or a combination of monomers having a different $R_{30}$ group can be used.

Chemical Formula 2D

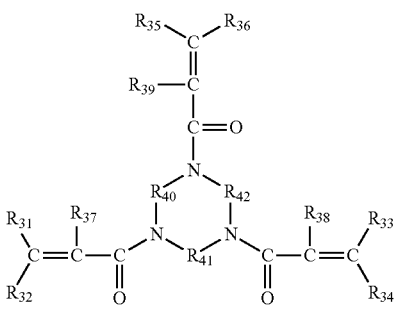

In Chemical Formula 2D, $R_{31}$ to $R_{39}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, and $R_{40}$ to $R_{42}$ are each independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, oxygen, or sulfur.

Chemical Formula 2E

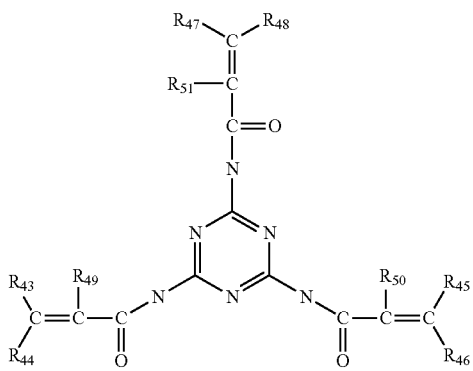

In Chemical Formula 2E, $R_{43}$ to $R_{51}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group.

Examples of a suitable monomer for preparing the second polymer may include methylenebis(meth)acrylamide, N,N-hexamethylenebis(meth)acrylamide, N,N-(p-phenylene)bis(meth)acrylamide, 4,4-methylenebis(phenyl(meth)acrylamide), N,N-(methylenebis-1,4-phenylene)bis((2-propene)amide), N,N-(methylenebis-1,4-phenylene)bis(acrylamide), 1,4-bis((meth)acryloyl)piperazine, 1,3,5-tri(meth)acryloyl-hexahydro-1,3,5-triazine, or a combination thereof.

The second polymer may include a moiety represented by the following Chemical Formulae 2F, 2G, and 2H, or a combination thereof.

Chemical Formula 2F

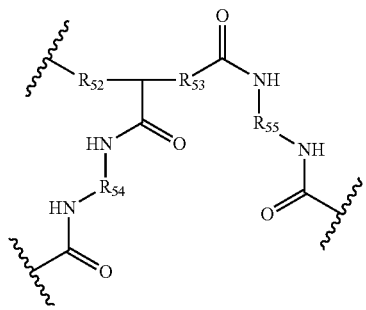

Chemical Formula 2G

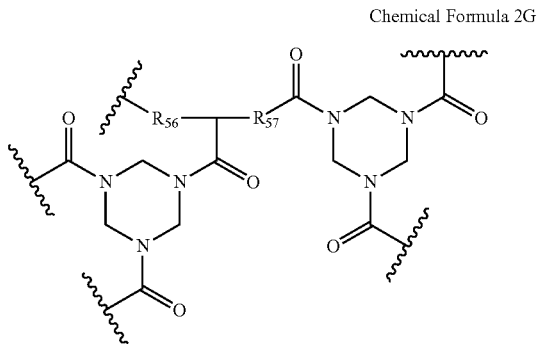

Chemical Formula 2H

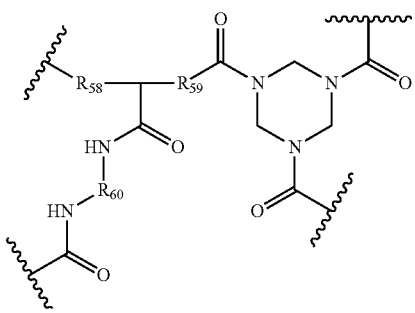

In Chemical Formulas 2F to 2H, $R_{52}$ to $R_{60}$ are each independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group.

Chemical Formulae 2F, 2G, and 2H may be represented by the following Chemical Formulae 2F-1, 2G-1, and 2H-1, respectively.

Chemical Formula 2F-1

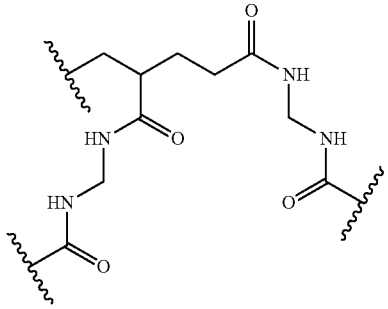

Chemical Formula 2G-1

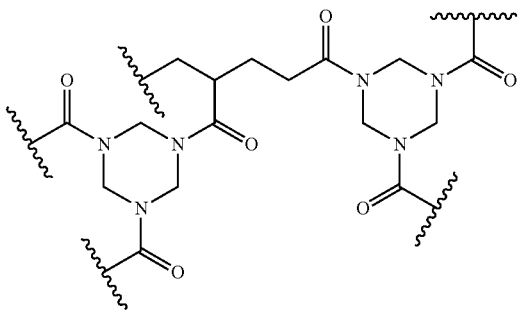

Chemical Formula 2H-1

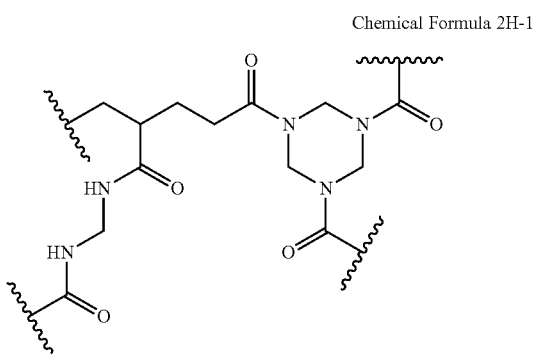

The substituted or unsubstituted alkyl cellulose compound used for preparing the third polymer may include the compound represented by following Chemical Formula 3A.

Chemical Formula 3A

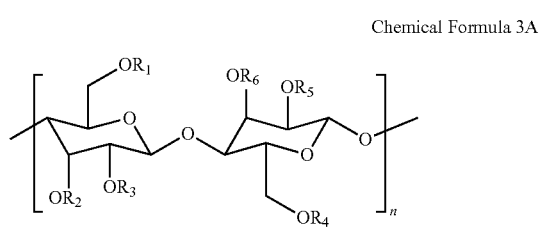

In Chemical Formula 3A, $R_1$ to $R_6$ are each independently a hydrogen, or a C1 to C10 alkyl group, provided that at least one of $R_1$ to $R_6$ is the C1 to C10 alkyl group, and n is about 10 to about 1000, specifically about 20 to about 900, more specifically about 40 to about 800.

The substituted or unsubstituted diisocyanate compound may be a substituted or unsubstituted alkylene diphenyl diisocyanate compound, an aliphatic diisocyanate compound, an alicyclic diisocyanate compound, an aromatic diisocyanate compound, or a combination thereof. The substituted or unsubstituted alkylene diphenyl diisocyanate compound may include the compound represented by the following Chemical Formula 3B.

Chemical Formula 3B

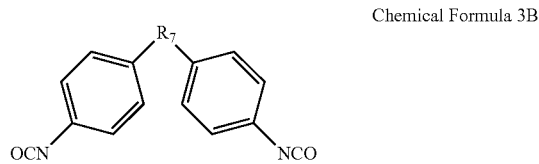

In Chemical Formula 3B, $R_7$ is a single bond or a C1 to C20 alkylene group.

An example of a substituted or unsubstituted alkylene diphenyl diisocyanate compound is methylene diphenyl diisocyanate represented by the following Chemical Formula 3B-1.

Chemical Formula 3B-1

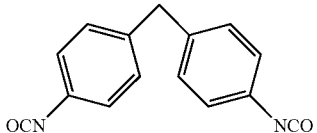

The fourth polymer is a polybenzoxazine polymerization product of a second aryl compound including at least two hydroxyl groups, an amine compound including at least two amine groups, and a second aldehyde compound. The second aryl compound comprising at least two hydroxyl groups used for preparing the fourth polymer may be represented by the following Chemical Formula 4A.

Chemical Formula 4A

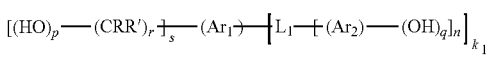

In Chemical Formula 4A, $Ar_1$ and $Ar_2$ are each independently a substituted or unsubstituted C6 to C30 arylene group, a substituted or unsubstituted C3 to C30 heteroarylene group, or a substituted or unsubstituted C7 to C30 alkylarylene group, provided that each $Ar_1$ includes at least one unsubstituted ring carbon (i.e., —CH—) at a position alpha (α) to a hydroxyl group (—OH), and $Ar_2$ includes at least one unsubstituted ring carbon (i.e., —CH—) at a position alpha (α) to the —(CRR')$_r$—(OH)$_p$ group, $L_1$ is a single bond, —O—, —S—, —S(O)$_2$—, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, R and R' are each independently hydrogen or a substituted or unsubstituted C1 to C10 alkyl group, r is an integer ranging from 0 to 4, s and n are each independently an integer ranging from 1 to 5, p and q are each independently an integer ranging from 1 to 4, and p+q is 2 or more provided that when $k_1$ is 0, p is 2, 3, or 4, and $k_1$ is an integer ranging from 0 to 4, wherein r+$k_1$ is 1 to 6, and is determined by the valence of $Ar_1$.

Examples of the compound of Chemical Formula 4A may include the compound of the following Chemical Formula 4B.

Chemical Formula 4B

In Chemical Formula 4B,

Each $L_1$ is independently a single bond, —O—, —(O)—, —S—, —S(O)$_2$—, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, $R_1$ and $R_2$ are each independently hydrogen, a hydroxyl group, a substituted or unsubstituted C1 to C10 alkyl group, a substituted or unsubstituted C1 to C10 alkoxy group, —NRR', —OR, —NH(C(O))R, —OC(O)R, a substituted or unsubstituted C6 to C18 aryl group, or —CH═CRR', wherein R and R' in —NRR', —OR, —NH(C(O))R, —OC(O)R, and —CH═CRR' are each independently hydrogen or a substituted or unsubstituted C1 to C10 alkyl group, p and q are each independently an integer ranging from 1 to 4, and p+q is 2 or more provided that when $k_1$ is 0, p is 2, 3 or 4, and a and b are each independently an integer ranging from 0 to 3, and $k_1$ is an integer ranging from 0 to 4, provided that at least two benzene rings of Chemical Formula 4B include at least one unsubstituted ring carbon (i.e., —CH—) at a position alpha (α) position to a hydroxyl group (—OH).

In an embodiment, $R_1$ and $R_2$ of Chemical Formula 4B are each independently hydrogen, a phenyl group, or —CH═CRR'.

In Chemical Formula 4B, $R_1$ and $R_2$ may each independently be a substituted or unsubstituted C1 to C10 alkyl group, a substituted or unsubstituted C1 to C10 alkoxy group, —NRR', —OR, NH(C(O))R, —OC(O)R, a substituted or unsubstituted C6 to C18 aryl group, or —CH═CRR', wherein R and R' in —NRR', —OR, NH(C(O))R, —OC(O)R, and —CH═CRR' are each independently hydrogen or a substituted or unsubstituted C1 to C10 alkyl group.

In Chemical Formula 4B, $L_1$ may be a linker represented by the following Chemical Formula 4C.

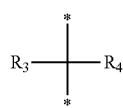

Chemical Formula 4C

In Chemical Formula 4C, $R_3$ and $R_4$ are each independently a substituted or unsubstituted C1 to C10 alkyl group, a substituted or unsubstituted C1 to C10 alkoxy group, a substituted or unsubstituted C3 to C20 cycloalkyl group, or a substituted or unsubstituted C6 to C18 aryl group. The alkyl group, cycloalkyl group, and aryl group of Chemical Formula 4C may each independently be substituted with a hydroxyl group.

The amine compound having at least two amine groups may be represented by the following Chemical Formula 4D.

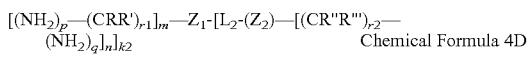

Chemical Formula 4D

In Chemical Formula 4D, $Z_1$ and $Z_2$ are each independently a substituted or unsubstituted C6 to C30 arylene group, a substituted or unsubstituted C3 to C30 heteroarylene group, a substituted or unsubstituted C7 to C30 alkylarylene group, or —N(R)—, wherein in —N(R)—, R is hydrogen, a C1 to C20 alkyl group, or an amine substituted C6 to C30 aryl group, each $L_2$ is independently a single bond, —O—, —(O)—, —S—, —S(O)$_2$—, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, n and m are each independently an integer ranging from 1 to 5, p and q are each independently an integer ranging from 1 to 4, provided that when $k_2$ is zero p is at least 2, R, R', R" and R"" of Chemical Formula 4D are each independently hydrogen or C1 to C10 alkyl group, r1 and r2 are each independently an integer ranging from 0 to 4, and $k_2$ is an integer ranging from 0 to 4, wherein m+$k_2$ is selected according to a valence of $Z_1$.

The amine compound comprising at least two amine groups for preparing the fourth polymer may be used in an amount ranging from about 1 to about 1.5 moles, specifically about 1.1 to about 1.4 moles, more specifically about 1.2 to about 1.3 moles, based on 1 mole of the second aryl compound comprising at least two hydroxyl groups.

The second aldehyde can be the same as is disclosed above for the first aldehyde compound. Specific examples of the second aldehyde compound include formaldehyde, furfural, paraformaldehyde, trioxymethylene, acetaldehyde, butyraldehyde, acrolein, furylacrolein, crotonaldehyde, glyoxal, benzaldehyde, or a combination thereof. The second aldehyde compound for preparing the fourth polymer may be used in an excess based on 1 mole of the second arylene compound comprising at least two hydroxyl groups.

The fifth polymer is a polymerization product of a third aryl compound including at least two hydroxy groups and further comprising at least two aryl groups linked to each other by a linker, a fourth aryl compound including at least two hydroxy groups and further comprising at least two aryl groups fused to each other, or a combination thereof, a first hydroxyl substituted benzene, and a third aldehyde compound. The third aryl compound comprising at least two hydroxyl groups and at least two aryl groups linked to each other by a linker used to preparing the fifth polymer may be represented by the following Chemical Formula 5A.

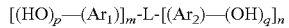    Chemical Formula 5A

In Chemical Formula 5A, $Ar_1$ and $Ar_2$ are each independently a substituted or unsubstituted C6 to C30 aryl group, a substituted or unsubstituted C3 to C30 heteroaryl group, or a substituted or unsubstituted C7 to C30 alkylaryl group, L is a single bond, —O—, —C(O)—, —S—, —S(O)$_2$—, —P(O)(R)—, —P(RR'R")— (wherein R in —P(O)(R)— is hydrogen, a C1 to C10 alkyl group, or a C6 to C20 aryl group and R, R', and R" in —P(RR'R")— are each independently hydrogen, a C1 to C10 alkyl group, or a C6 to C20 aryl group), a substituted or unsubstituted C1 to C30 alkylene group, a substituted or unsubstituted C3 to C30 cycloalkylene group, a substituted or unsubstituted C6 to C30, arylene group, a substituted or unsubstituted C7 to C30 arylalkylene group, a substituted or unsubstituted C12 to C18 arylalkylenearylenealkylene group, a substituted or unsubstituted C1 to C30 heteroalkylene group, a substituted or unsubstituted C2 to C30 heterocycloalkylene group, or a substituted or unsubstituted C2 to C30 alkenylene group, n and m are each independently integers ranging from 1 to 5, wherein n+m is determined according to a valence of L, and p and q are each independently integers ranging from 1 to 4.

In an embodiment, $Ar_1$ and $Ar_2$ are the same or different, and are a substituted or unsubstituted C6 to C30 aryl group; L is a single bond, —O—, —C(O)—, —S—, —S(O)$_2$—, a substituted or unsubstituted C1 to C30 alkyl group, a substituted or unsubstituted C6 to C30, aryl group, a substituted or unsubstituted C7 to C30 arylalkyl group, or a substituted or unsubstituted C12 to C18 arylalkylenearylenealkylene group, n and m are each independently an integer ranging from 1 to 3, with the proviso that n+m is selected so that a valence of L is not exceeded, and p and q are each independently an integer ranging from 1 to 4.

Examples of the third aryl compound comprising at least two hydroxyl groups and at least two aryl groups linked to each other by a linker include dihydroxy diphenyl ether, dihydroxy diphenyl propane, or a combination thereof.

The fourth aryl compound comprising at least two hydroxyl groups and at least two aryl groups fused to each other may be represented by the following Chemical Formula 5B.

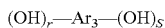

$(OH)_r$—$Ar_3$—$(OH)_S$     Chemical Formula 5B

In Chemical Formula 5B, $Ar_3$ is a substituted or unsubstituted C10 to C30 aryl group, a substituted or unsubstituted C7 to C30 arylalkyl group, or a substituted or unsubstituted C2 to C30 heteroaryl group, provided that each of the foregoing groups comprises a fused aryl moiety, and r and s are each independently an integer ranging from 1 to 5, wherein r+s is determined by the valence of $Ar_3$.

An example of the compound of Chemical Formula 5A may include a compound of the following Chemical Formula 5C.

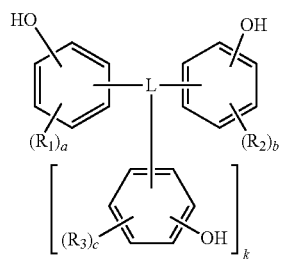

Chemical Formula 5C

In Chemical Formula 5C,

L is a single bond, —O—, —C(O)—, —S—, —S(O)$_2$—, —P(O)R—, —P(RR'R")— (wherein in —P(O)(R)—, R is hydrogen, a C1 to C10 alkyl group, or a C6 to C20 aryl group and in —P(RR'R")—R, R', and R" are each independently hydrogen, a C1 to C10 alkyl group, or a C6 to C20 aryl group), a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C12 to C18 arylalkylenearylenealkylene group, a substituted or unsubstituted C1 to C30 heteroalkylene group, a substituted or unsubstituted C2 to C30 heterocycloalkylene group, or a substituted or unsubstituted C2 to C30 alkenylene group, $R_1$, $R_2$ and $R_3$ are each independently hydrogen, a substituted or unsubstituted C1 to C10 alkyl group, a substituted or unsubstituted C1 to C10 alkoxy group, —NRR', —OR, —NH(C(O))R, —OC(O)R, a substituted or unsubstituted C6 to C18 aryl group, or —CH=CRR', wherein R and R' in —NRR', —OR, —NH(C(O))R, —OC(O)R, and —CH=CRR' are each independently hydrogen, or a substituted or unsubstituted C1 to C10 alkyl group, a, b and c are independently integers ranging from 1 to 3, and k is an integer ranging from 0 to 3.

In Chemical Formula 5C, $R_1$, $R_2$ and $R_3$ each independently may be a substituted or unsubstituted C1 to C10 alkyl group, a substituted or unsubstituted C1 to C10 alkoxy group, —NRR', —OR, —NH(C(O))R, —OC(O)R, a substituted or unsubstituted C6 to C18 aryl group, or —CH=CRR', wherein R and R' in —NRR', —OR, —NH(C(O))R, —OC(O)R, and —CH=CR are each independently hydrogen or a substituted or unsubstituted C1 to C10 alkyl group. In an embodiment, at least one of $R_1$, $R_2$ and $R_3$ is a phenyl group, or —CH=CRR', wherein R and R' in —CH=CRR' are each independently hydrogen or a substituted or unsubstituted C1 to C10 alkyl group.

In Chemical Formula 5C, L may be a linker represented by the following Chemical Formulas 5D and 5D'.

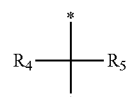

Chemical Formula 5D

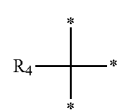

Chemical Formula 5D'

In Chemical Formulas 5D and 5D', $R_4$ and $R_5$ are each independently hydrogen, a substituted or unsubstituted C1 to C10 alkyl group, a substituted or unsubstituted C1 to C10 alkoxy group, a substituted or unsubstituted C3 to C20 cycloalkyl group, a substituted or unsubstituted C6 to C18 aryl group, or a substituted or unsubstituted C12 to C18 arylalkylenearyl group, wherein $R_4$ and $R_5$ are optionally linked to form a ring.

In a specific embodiment, $R_4$ and $R_5$ are the same or different, and are each independently a substituted or unsubstituted C1 to C10 alkyl group, a substituted or unsubstituted C6 to C18 aryl group, or a substituted or unsubstituted C12 to C18 arylalkylenearyl group.

Examples of the linker of Chemical Formulas 5D and 5D' include the following Chemical Formulas 5D-1 to 5D-4.

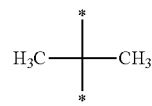

Chemical Formula 5D-1

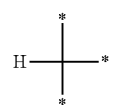

Chemical Formula 5D-2

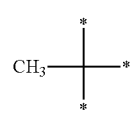

Chemical Formula 5D-3

Chemical Formula 5D-4

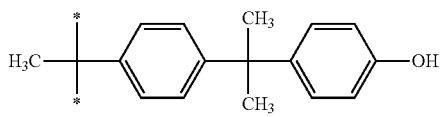

As example of a linker L forming a ring by linking $R_4$ and $R_5$ of Chemical Formula 5D is the following Chemical Formula 5E.

Chemical Formula 5E

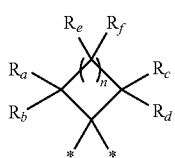

In Chemical Formula 5E, $R_a$ to $R_f$ are each independently hydrogen, a C1 to C10 alkyl group, or a C6 to C20 aryl group, and n is an integer ranging from 1 to 5.

The first hydroxyl group-containing benzene used to form the fifth polymer may be represented by the following Chemical Formula 5F.

Chemical Formula 5F

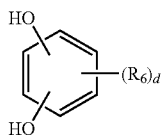

In Chemical Formula 5F, each $R_6$ is independently hydrogen, a hydroxyl group, a substituted or unsubstituted C1 to C10 alkyl group, a substituted or unsubstituted C1 to C10 alkoxy group, —NRR', —OR, —NH(C(O))R, —OC(O)R, a substituted or unsubstituted C6 to C18 aryl group, or —CH=CRR', wherein R and R' in —NRR', —OR, —NH(C(O))R, —OC(O)R, or —CH=CRR' are each independently hydrogen, or a substituted or unsubstituted C1 to C10 alkyl group, and d is an integer of 1 or 2.

Examples of the hydroxyl substituted benzene include resorcinol, hydroquinone, catechol, phloroglucinol, or a combination thereof.

The first monomer used for preparing the fifth polymer, i.e., the third aryl compound comprising at least two hydroxyl groups, may be used in an amount of about 1 to about 99 parts by weight, specifically about 2 to 98 parts by weight, more specifically 3 to 97 parts by weight, based on 100 parts by weight of the second monomer.

The third aldehyde can be the same as disclosed above for the first aldehyde compound. Specific examples of the third aldehyde compound include formaldehyde, furfural, paraformaldehyde, trioxymethylene, acetaldehyde, butyraldehyde, acrolein, furylacrolein, crotonaldehyde, glyoxal, benzaldehyde, or a combination thereof. The third aldehyde compound can be used in an excess relative to the moles of the other monomers used to manufacture the fifth polymer.

The substituted or unsubstituted maleimide compound used for preparing the sixth polymer may include the compound represented by following Chemical Formula 6A.

Chemical Formula 6A

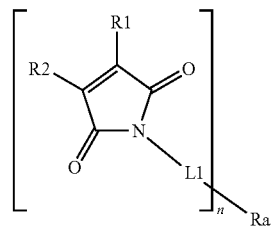

In Chemical Formula 6A,

R1 and R2 are each independently hydrogen, or a substituted or unsubstituted C1 to C30 alkyl group, and each L1 is independently a single bond, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, or a substituted or unsubstituted C2 to C30 alkenylene group, n is 1 to 3, and when n is 1, Ra is a substituted or unsubstituted C3 to C30 cycloalkyl group, a substituted or unsubstituted C6 to C30 aryl group, a substituted or unsubstituted C3 to C30 heterocycloalkyl group, or a substituted or unsubstituted C6 to C30 heteroaryl group, or Ra is hydrogen if L1 is not a single bond, and when n is 2 or 3, Ra is a substituted or unsubstituted C3 to C30 cycloalkylene group, a substituted or unsubstituted C6 to C30 arylene group, a substituted or unsubstituted C3 to C30 heterocycloalkylene group including N, O, S, or P, a substituted or unsubstituted C6 to C30 heteroarylene group including N, O, S, or P, or a combination thereof.

The sixth polymer is prepared by polymerization of a substituted or unsubstituted maleimide compound with a compound having at least two double bonds reactive with the substituted or unsubstituted maleimide compound. The substituted or unsubstituted maleimide compound for preparing the sixth polymer may be a substituted or unsubstituted bismaleimide compound represented by the following Chemical Formula 6B.

Chemical Formula 6B

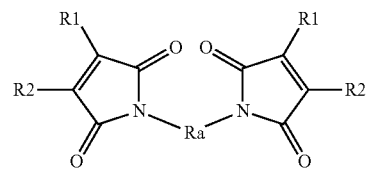

In Chemical Formula 6B,

R1 and R2 are independently hydrogen or a substituted or unsubstituted C1 to C30 alkyl group, Ra is a substituted or unsubstituted C3 to C30 cycloalkylene group, a substituted or unsubstituted C6 to C30 arylene group, a substituted or unsubstituted C3 to C30 heterocycloalkylene group, a substituted or unsubstituted C6 to C30 heteroarylene group.

The substituted or unsubstituted bismaleimide compound may be represented by the following Chemical Formulae 6C to 6E.

Chemical Formula 6C

Chemical Formula 6D

Chemical Formula 6E

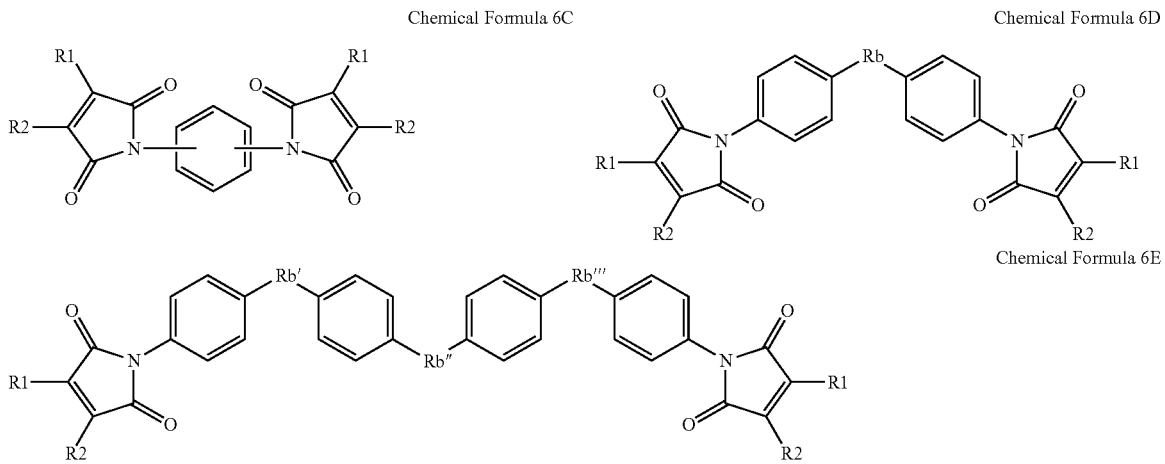

In Chemical Formulae 6C to 6E,

R1 and R2 are each independently hydrogen or a substituted or unsubstituted C1 to C30 alkyl group, Rb, Rb', Rb" and Rb''' are each independently a C1 to C10 alkyl group, a C1 to C10 heteroalkyl group, O, or S.

The compound having at least two double bonds reactive with the substituted or unsubstituted maleimide compound used to prepare the sixth polymer may include a substituted or unsubstituted C6 to C30 aromatic compound, a substituted or unsubstituted C1 to C20 acrylate compound, a substituted or unsubstituted C1 to C20 acrylamide compound, or a combination thereof.

The compound having at least two double bonds reactive with the substituted or unsubstituted maleimide compound may include a compound represented by the following Chemical Formulae 6F to 6I.

Chemical Formula 6F

Chemical Formula 6G

Chemical Formula 6H

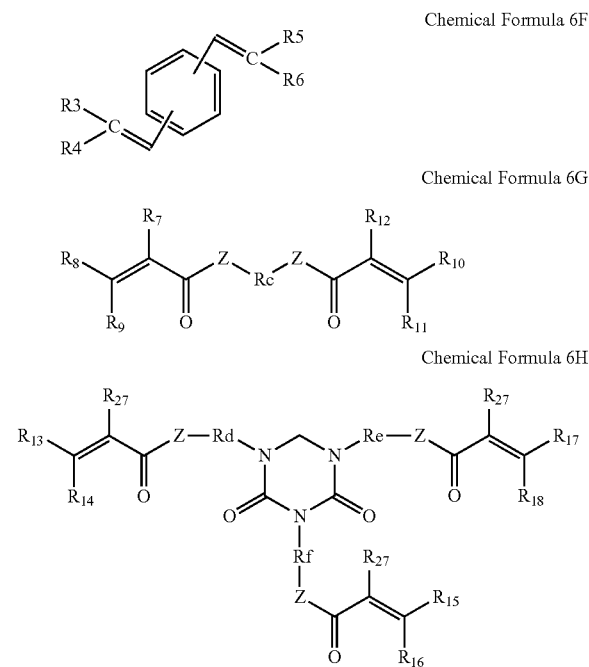

-continued

Chemical Formula 6I

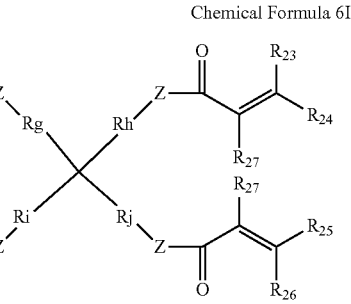

In Chemical Formulae 6F to 6I,

R3 to R27 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, Rc to Rj are each independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, and each Z is independently O or NH.

In an embodiment, R7, R12, and R27 are each independently hydrogen or methyl, optionally wherein each Z is O.

The seventh polymer is a polymerization product of an aromatic compound including at least two unsaturated functional groups, and a monomer comprising at least two (meth)acryloyl groups reactive with the at least two unsaturated functional groups. The aromatic compound having at least two unsaturated functional groups used for preparing the seventh polymer may be a compound represented by the following Chemical Formula 7A.

$(Y_1)_p$—$(Ar)$—$(Y_2)_q$   Chemical Formula 7A

In Chemical Formula 7A,

Ar is a substituted or unsubstituted C6 to C30 arylene group, a substituted or unsubstituted C3 to C30 heteroarylene group, a group comprising at least two substituted or unsubstituted C6 to C30 arylene groups linked by a single bond or a linker, or a group including at least two substituted or unsubstituted C3 to C30 heteroarylene groups linked by a single bond or a linker, $Y_1$ and $Y_2$ are each independently a double-bond-containing functional group or a triple-bond-containing functional group, and each of p and q is independently an integer ranging from 1 to 5 and is selected according to a valence of Ar.

The double bond functional group in Chemical Formula 7A includes a substituted or unsubstituted C2 to C10 alkenyl group, a vinyl group, an allyl group, a (meth)acrylate group, or the like. The triple bond functional group includes a C2 to C10 alkynyl group.

In an embodiment the linker in Ar of Chemical Formula 7A is selected from a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, or a substituted or unsubstituted C2 to C30 alkenylene group.

The monomer comprising at least two (meth)acryloyl groups reactive with the at least two unsaturated functional groups may include an N-(meth)acrylamido group, a (meth)acrylate group, or a combination thereof. In an embodiment this monomer may be represented by Chemical Formula 7B.

Chemical Formula 7B

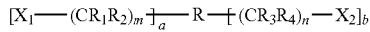

In Chemical Formula 7B, $X_1$ and $X_2$ are each independently an N-(meth)acrylamido group or a (meth)acrylate group, R is a substituted or unsubstituted C1 to C30 alkyl group, a substituted or unsubstituted C6 to C30 aryl group, or a substituted or unsubstituted C2 to C30 heteroaryl group, $R_1$, $R_2$, $R_3$, and $R_4$ are each independently hydrogen, a substituted or unsubstituted C1 to C10 alkyl group, a substituted or unsubstituted C1 to C10 alkoxy group, —NRR', —OR, —NH(C(O))R, —OC(O)R, a substituted or unsubstituted C6 to C18 aryl group, or —CH=CRR', wherein R and R' are each independently hydrogen, or a substituted or unsubstituted C1 to C10 alkyl group, m and n are each independently an integer ranging from 0 to about 20, provided that when R is an arylene group or a heteroarylene group, m and n are each independently an integer ranging from about 1 to about 20, and a and b are each independently an integer ranging from 0 to 4, with the proviso that a and b are not simultaneously 0, and a+b is selected according to a valence of R and is an integer of 2 or more.

Examples of the monomer comprising at least two N-(meth)acryloyl groups used for preparing the seventh polymer may include a (C1 to C30) alkylene di(meth)acrylate, such as ethylene di(meth)acrylate; a (C1 to C30) alkane polyol poly(meth)acrylate, such as glycerol di- or tri-(meth)acrylate, 1,4-butanediol di(meth)acrylate, 1,6-hexanediol di(meth)acrylate, trimethylolpropyl di- or tri(meth)acrylate, pentaerythritol tri(meth)acrylate, pentaerythritol tetra(meth)acrylate, dipentaerythritol penta(meth)acrylate, dipentaerythritol hexa(meth)acrylate, or the like; or an N,N'-alkylene-bis(meth)acrylamide such as N,N'-methylene-bis(meth)acrylamide, N,N'-ethylene-bis(meth)acrylamide, or the like. A combination comprising at least two of the foregoing can be used.

The aromatic compound including at least two unsaturated functional groups and the monomer comprising at least two N-(meth)acryloyl groups reactive with the at least two unsaturated functional groups may be used in a weight ratio of about 10:90 to about 90:10, specifically about 15:85 to about 85:15, more specifically about 20:80 to about 80:20.

The eighth polymer is a polymerization product of a second hydroxyl substituted benzene and a fourth aldehyde compound. The second hydroxyl substituted benzene can be the same as disclosed above for the first hydroxyl substituted benzene, and the fourth aldehyde compound can be the same as disclosed above for the first aldehyde compound, and thus the foregoing description is not repeated for clarity.

The aerogel matrix polymer may comprise each of the first polymer, the second polymer, the third polymer, the fourth polymer, the fifth polymer, the sixth polymer, and the seventh polymer. The aerogel matrix polymer may further optionally comprise the eighth polymer.

According to another embodiment, an aerogel-foam composite is provided that includes an open cell foam and an aerogel matrix polymer disposed in the open cell foam, and the open cell foam is a polyurethane foam including a carbonate group (—OC(O)O—). The open cell foam may include a polymer including a first structural unit having a carbonate group (—OC(O)O—), a second structural unit having an urethane group (—OC(O)NH—), and a third structural unit having an urea group (—NHC(O)NH—). The aerogel matrix polymer may include any one or combination of the first polymer to the seventh polymer, and may further comprise the eighth polymer.

The open cell foam may include a structural unit including a carbonate group (—OC(O)O—) in an amount of about 5 to about 30 wt %, specifically 10 to about 25 wt %, more specifically 15 to about 20 wt %. When the carbonate group is used within the foregoing range, an aerogel-foam composite may have improved mechanical properties.

The aerogel-foam composite may be obtained by impregnating an open cell foam with a monomer composition for the production of an aerogel, polymerizing the monomer composition to prepare a wet gel, and drying a wet gel, but it's the method of making is not limited thereto.

Hereinafter, a method of making the aerogel-foam composite is further described referring to FIG. 1.

Referring to FIG. 1, an open cell foam is fabricated or provided in process S11. The open cell foam may be fabricated by reacting monomers that are used for preparing a polymer in the presence of a foaming agent, or commercially-available open cell foam may be used. For example, a polyurethane foam may be fabricated by reacting a polyol and an isocyanate group-containing monomer in the presence of a foaming agent.

The open cell foam is impregnated with a composition for the production of an aerogel matrix polymer in process S12. The monomers included in the composition for an aerogel matrix polymer is polymerized to provide a wet gel in process S13. The composition for the production of the aerogel matrix polymer comprises monomers that may be polymerized to provide the aerogel matrix polymer. The monomers for preparing the aerogel matrix polymer comprise the monomers for preparing the first polymer to the seventh polymer, respectively.

The composition for the aerogel matrix polymer may further include a catalyst. The catalyst may be used in an amount of about 0.1 to about 5 parts by weight, specifically about 0.2 to about 4 parts by weight, more specifically about 0.3 to about 3 parts by weight, based on 100 parts by weight of the composition for the aerogel matrix polymer. The catalyst for a radical polymerization may comprise a thermal catalyst that is decomposed by heat, or a photo-degradation catalyst that produces a radical when decomposed by light, such as ultraviolet ("UV") light. Examples of the thermal catalyst include an azo compound catalyst such as azobisisobutyronitrile ("AIBN"), or a peroxide catalyst comprising organic peroxide or inorganic peroxide, such as benzoyl peroxide.

The composition for the aerogel matrix polymer may further comprise a solvent. The solvent may be an organic solvent, and the organic solvent may include dimethyl formamide, acetone, 1,4-dioxane, tetrahydrofuran, dimethyl sulfoxide, toluene, benzene, dichlorobenzene, acetonitrile, an alcohol, or a combination thereof. The amount of the solvent may be selected according to a selected target density of the aerogel matrix polymer.

The wet gel may undergo a solvent exchange reaction, and the solvent may comprise any solvent having good liquid compatibility with carbon dioxide, without limitation. However, when the wet gel is dried under atmospheric pressure or the solvent used during the preparation of the wet gel has sufficient compatibility with carbon dioxide, a solvent exchange process may be omitted.

Subsequently, the wet gel is dried in process S14. Drying the wet gel in process S15 provides an aerogel-foam composite.

The drying is performed, for example, by supercritical drying, atmospheric pressure drying, lyophilizing (e.g., reduced pressure drying), or a combination thereof.

The supercritical drying uses supercritical carbon dioxide. In a supercritical drying process, first, liquid carbon dioxide is supplied to a high-pressure reactor to remove solvent in a wet gel. Then the temperature and pressure of the high-pressure reactor are raised above the threshold points of carbon dioxide, and the carbon dioxide is slowly ejected under reduced pressure to remove the carbon dioxide and dry the wet gel. The supercritical drying may be performed at room temperature. Supercritical drying may be desirable because it provides good processability and safety.

The atmospheric pressure drying method involves drying a wet gel by heat treating the wet gel under atmospheric pressure. When the solvent is removed in the atmospheric pressure drying method, the resultant product is called xerogel, which is a type of aerogel.

Lyophilizing (e.g., reduced pressure drying) is a method of removing solvent by freezing the wet gel including an aqueous solution and reducing the pressure to sublimate ice. When the solvent is removed through the lyophilizing (e.g., reduced pressure drying), the resulting product is called a cryogel, which is a type of aerogel.

The aerogel-foam composite according to an embodiment undergoes negligible shrinkage during the solvent exchange and drying processes and maintains pores after the drying.

Because the aerogel-foam composite has excellent adiabatic and sound absorption properties, it may be applied to a cooling device such as a refrigerator, a freezer, a cryogenic storage unit such as is used for liquid natural gas ("LNG"), and a freight vessel, and may be used as an adiabatic material for aerospace applications, piping, buildings, and construction and as an adiabatic fabric for clothing and shoes, as a catalyst carrier, and as a sound absorption material or a vibration reduction material. Also, through pyrolysis, the aerogel-foam composite may be converted to be a carbon aerogel-foam composite, and the carbon aerogel-foam composite may be used as an electrode material.

Hereinafter, this disclosure is illustrated in more detail with reference to examples. However, the examples are exemplary embodiments of this disclosure and shall not be limiting.

Preparation of Open Cell Foam

Preparation Example 1

Poly(1,6-hexamethylene carbonate)diol of Chemical Formula 8 having a molecular weight of 650 in an amount of 30 wt % and 70 wt % of methylene diphenyl diisocyanate were polymerized in the presence of a Sn(Oct)$_2$ catalyst (i.e., 1,3-propanediol, 2-(9-octadecenyloxy)-, (Z)-2-o-(9-octadecenyl)glycerol Sn-2-o-(cis-9)octadecenylglycerol) to prepare an open cell foam having 30 wt % of a structural unit including a carbonate group.

Chemical Formula 8

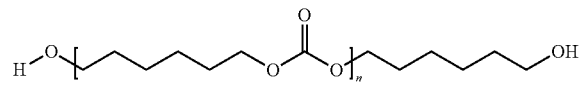

In Chemical Formula 8, n represents a number of repeat units and is selected according to a desired molecular weight.

Preparation of Aerogel-Foam Composite

Example 1

Acetonitrile, 13 milliliters (mL) is added to a 25 mL cylindrical polypropylene vial, and 1.00 grams (g) of resorcinol, 0.8 mL of HCl (0.6 molar (M) acetonitrile solution), 1.5 mL of formalin (37 wt % aqueous solution), and 0.2 mL of pentaerythritol (15 wt % aqueous solution) are added thereto. The resulting mixture is actively agitated to prepare a composition for an aerogel. The open cell foam obtained from Preparation Example 1 is impregnated with the composition for an aerogel.

Next, the impregnated open cell foam is slowly heated to about 60° C. for about 10 minutes. Formation of a gel is identified by fluidity on the surface, and the impregnated open cell foam is cured at room temperature of 25° C.

The prepared wet gel is exchanged with acetone, which is a solvent having good compatibility with liquid carbon dioxide. Then, the liquid carbon dioxide is provided to a high pressure reactor to remove the acetone inside the wet gel. When the acetone inside the wet gel is removed, an aerogel-foam composite is prepared by increasing its temperature and pressure beyond the threshold temperature and pressure of carbon dioxide and then slowly removing the carbon dioxide at the same temperature to reduce the pressure.

Example 2

An aerogel-foam composite is made according to the same method as Example 1, except that 1.0 g of methylene bisacrylamide is dissolved in 6.5 mL of N,N-dimethyl formamide ("DMF"), 1.0 mL of ammonium persulfate (1.0 M aqueous solution) is included as a radical initiator, and 0.02 mL of tetramethylethylene diamine is included as a catalyst, and then the combination is actively agitated at room temperature for one minute to prepare a composition for an aerogel.

Example 3

An aerogel-foam composite is made according to the same method as Example 1, except for 1.0 g of ethyl cellulose and 1.0 g of methylene diphenyl diisocyanate are dissolved in 10 mL of acetone, and 0.01 g of pyridine is added as a catalyst to prepare a composition for an aerogel. The ethyl cellulose is available from Sigma-Aldrich company, which includes 5 mol % of ethyl cellulose in a mixed solvent of toluene/ethanol at a 80:20 volume ratio and has a 48 mol % ethoxyl substitution ratio.

Example 4

An aerogel-foam composite is made according to the same method as Example 1, except that 0.126 g of 1,3,5-trihydroxybenzene ("THB") and 0.297 g of diaminophenylmethane ("MDA") are dissolved with 4.23 mL of N,N-dimethyl formamide ("DMF") solvent, and then 0.487 g of a 37 wt % formaldehyde aqueous solution (formalin, 37 wt % of HCHO in $H_2O$; "aF") is added thereto to prepare a composition for an aerogel. The reactants, i.e., THB, MDA, and aF are used at a mole ratio of 1:1.5:6.

Example 5

An aerogel-foam composite is prepared according to the same method as Example 1, except that 8.7 mL of acetonitrile and 0.5 mL of dimethyl formamide are added and 0.28 g of 4,4'-biphenol ("BP"), 0.33 g of resorcinol, 1.0 g of formaldehyde, and 0.06 mL of 1.5M HCl are dissolved to prepare a composition for an aerogel.

Example 6

An aerogel-foam composite is prepared according to the same method as Example 1, except that 4 g of N,N'-1,3-phenylene bismaleimide represented by the following Chemical Formula 9 and 26 g of 1,3-triacryloylhexahydro-1,3,5-triazine are dissolved in 250 g of N-methylpyrrolidone ("NMP"), and 2 wt % of 2,2'-azobisisobutyronitrile ("AIBN") as a radical initiator is added thereto to prepare a composition for an aerogel.

Chemical Formula 9

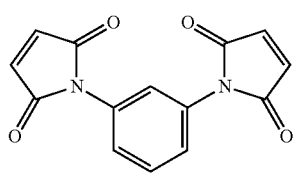

Example 7

An aerogel-foam composite is prepared according to the same method as Example 1, except that divinylbenzene and 1,1'-(methylenedi-1,4-phenylene)bismaleimide are dissolved at a weight ratio of about 22:4 in 250 g of N-methylpyrrolidone ("NMP"), and 2 wt % of 2,2'-azobisisobutyronitrile ("AIBN") radical initiator is added to prepare a composition for an aerogel.

Example 8

An aerogel-foam composite is prepared according to the same method as Example 1, except that divinylbenzene and N,N'-(4-methyl-1,3-phenylene)bismaleimide are dissolved at a weight ratio of about 22:4 in 250 g of N-methylpyrrolidone ("NMP"), and 2 wt % of a 2,2'-azobisisobutyronitrile ("AIBN") radical initiator is added to prepare a composition for an aerogel.

Example 9

An aerogel-foam composite is prepared according to the same method as Example 1, except that 26 g of divinylbenzene ("DVB") and 4 g of pentaerythritol tetraacrylate are dissolved in 250 ml of N-methylpyrrolidone ("NMP"), and 2 wt % of an azobisisobutyronitrile ("AIBN") radical initiator is added to prepare a composition for an aerogel.

The aerogel-foam composites according to Examples 1 to 9 are measured regarding a shrinkage ratio, density, compression strength, and thermal conductivity. The results of Examples 1 to 9 (shrinkage ratio for Examples 2, 3, 5, and 7 to 9, densities for Examples 2 to 9, compression strength for Examples 1, 2, and 4 to 9) and thermal conductivity for Examples 1 to 9) are provided in Table 1. Thermal conductivity (milliWatts per milliKelvin ("mW/Mk")) is measured using Heat flow meter (HFM 436) of Netzsch company, Selb Germany. Compression strength (megaPascal ("MPa") is measured using universal testing machine, ("UTM"), when the aerogel-foam composites are compressed by 10% according to ASTM D1621, at a 10 millimeters per minute ("mm/min") compression rate.

TABLE 1

| | Shrinkage ratio (%) | Density ($g/cm^3$) | Compression strength (MPa) | Thermal conductivity (mW/mK) |
|---|---|---|---|---|
| Example 1 | — | — | 68.71 | 17.90 |
| Example 2 | 15.5 | 0.21 | 24.4 | 18.30 |
| Example 3 | 6.3 | 0.27 | — | 24.10 |
| Example 4 | — | 0.12 | 65.6 | 16.10 |
| Example 5 | 16.2 | 0.18 | 24.0 | 19.00 |
| Example 6 | — | 0.08 | 19.6 | 16.34 |
| Example 7 | 16.3 | 0.21 | 27.0 | 22.00 |
| Example 8 | 7.3 | 0.18 | 19.0 | 22.00 |
| Example 9 | 13.5 | 0.14 | 21.0 | 21.00 |

(In Table 1, the symbol "—" denotes "not measured")

Referring to Table 1, the aerogel-foam composites of Examples have excellent compression strength and low thermal conductivity. While not wanting to be bound by theory, it is believed that the results in Table 1 illustrate that the shrinkage may depend on the constitution of the material, rather than parameters such as density and thermal conductivity.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. An aerogel-foam composite comprising:
an open cell foam; and
an aerogel matrix polymer disposed in the open cell foam, wherein the aerogel-foam composite has compression strength of about 15 megaPascals (MPa) or more, wherein the open cell foam has porosity of about 90% or more, wherein the open cell foam comprises a polymer selected from polyurethane, polyvinylchloride, polycarbonate, polyester, polymethyl(meth)acrylate, polyurea, polyether, polyisocyanurate, or a combination thereof, and wherein the aerogel matrix polymer comprises a first polymer that is a polymerization product of a first aryl compound comprising at least one hydroxy group, a first aldehyde compound, and a polyol compound.

2. The aerogel-foam composite of claim 1, wherein the open cell foam comprises a polyurethane foam comprising a carbonate group.

3. The aerogel-foam composite of claim 1, wherein the open cell foam comprises a polymer comprising a first structural unit comprising a carbonate group, a second structural unit comprising a urethane group, and a third structural unit comprising a urea group.

4. The aerogel-foam composite of claim 2, wherein the polymer comprises a structural unit comprising a carbonate group in an amount of about 5 to about 30 weight percent.

5. The aerogel-foam composite of claim 1, wherein the aerogel-foam composite has thermal conductivity of about 25 mW/mK or less.

6. The aerogel-foam composite of claim 1, wherein the aerogel-foam composite has compression strength of about 19 megaPascals (MPa) or more.

7. The aerogel-foam composite of claim 1, wherein the first polymer comprises a structural unit represented by the following Chemical Formula 1A:

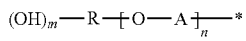

Chemical Formula 1A wherein in Chemical Formula 1A,

R is a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C2 to C20 heteroarylene group, each A is independently a structural unit represented by the following Chemical Formula 1B, m is 0 to 10, and n is an integer ranging from 2 to 10,

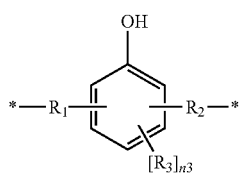

Chemical Formula 1B wherein in Chemical Formula 1B, $R_1$ and $R_2$ are each independently a single bond, a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C6 to C20 heteroarylene group, each $R_3$ is independently hydrogen, a hydroxyl group, a substituted or unsubstituted C1 to C20 alkoxy group, or a substituted or unsubstituted amino group, and $n_3$ is an integer ranging from 0 to 3.

8. The aerogel-foam composite of claim 1, wherein the polyol compound is represented by Chemical Formula 1C:

Chemical Formula 1C wherein in Chemical Formula 1C, $R_9$ is a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C2 to C20 heteroarylene group, and $n_9$ is an integer ranging from 2 to 10.

9. The aerogel-foam composite of claim 1, wherein the first polymer further includes a structural unit represented by the following Chemical Formula 1D, a structural unit represented by the following Chemical Formula 1F, or a combination thereof:

Chemical Formula 1D wherein in Chemical Formula 1D, $R_4$ is a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C2 to C20 heteroarylene group, each Q is independently a structural unit represented by the following Chemical Formula 1E, and
n$_4$ is an integer ranging from 2 to 4,

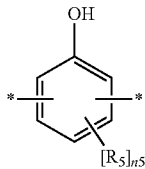

Chemical Formula 1E wherein in Chemical Formula 1E,
each R$_5$ is independently hydrogen, a hydroxyl group, a substituted or unsubstituted C1 to C20 alkoxy group, or a substituted or unsubstituted amino group, and
n$_5$ is an integer ranging from 0 to 3,

*-D$_1$-O-D$_2$-*  Chemical Formula 1F wherein in Chemical Formula 1° F.,
D$_1$ and D$_2$ are each independently a structural unit represented by the following Chemical Formula 1G,

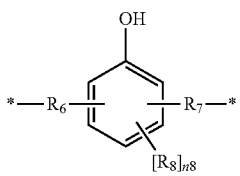

Chemical Formula 1G wherein in Chemical Formula 1G,
R$_6$ and R$_7$ are each independently a single bond, a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C3 to C20 cycloalkynylene group, a substituted or unsubstituted C2 to C20 heterocycloalkylene group, a substituted or unsubstituted C2 to C20 heterocycloalkenylene group, a substituted or unsubstituted C2 to C20 heterocycloalkynylene group, a substituted or unsubstituted C6 to C20 arylene group, or a substituted or unsubstituted C6 to C20 heteroarylene group,
each R$_8$ is independently hydrogen, a hydroxyl group, a substituted or unsubstituted C1 to C20 alkoxy group, or a substituted or unsubstituted amino group, and
n$_8$ is an integer ranging from 0 to 3, and X$_1$ and X$_2$ are each independently integers from 0 to 1.

10. The aerogel-foam composite of claim 1, wherein the polyol compound is included in an amount of about 0.05 to about 30 weight percent, based on the total weight of the first aryl compound comprising at least one hydroxy groups, the aldehyde compound, and the polyol compound.

11. The aerogel-foam composite of claim 1, wherein the aerogel matrix polymer further comprises a second polymer that is a polymerization product of a substituted or unsubstituted bis(meth)acrylamide, a substituted or unsubstituted tris(meth)acrylamide, or a combination thereof.

12. The aerogel-foam composite of claim 11, wherein the second polymer is a polymerization product of a monomer represented by the following Chemical Formulas 2A to 2E, or combination thereof:

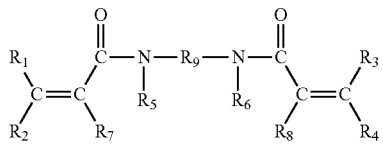

Chemical Formula 2A wherein in Chemical Formula 2A,
R$_1$ to R$_8$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, and
R$_9$ is a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C13 to C30 arylalkylenearylenealkylene group, a substituted or unsubstituted C1 to C30 heteroalkylene group, a substituted or unsubstituted C2 to C30 heterocycloalkylene group, or a substituted or unsubstituted C2 to C30 alkenylene group,

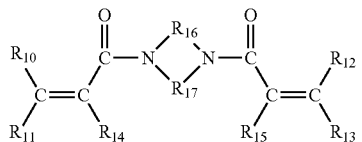

Chemical Formula 2B wherein in Chemical Formula 2B,
R$_{10}$ to R$_{15}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, and
R$_{16}$ and R$_{17}$ are each independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, or a substituted or unsubstituted C2 to C30 alkenylene group, Chemical Formula 2C

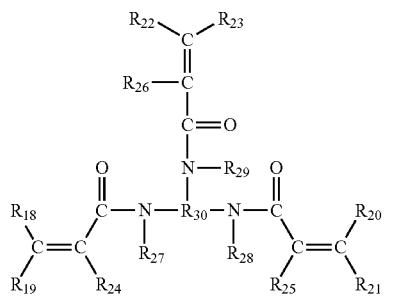

wherein in Chemical Formula 2C,
$R_{18}$ to $R_{29}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, $R_{30}$ is a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, or a substituted or unsubstituted C2 to C30 alkenylene group, Chemical Formula 2D

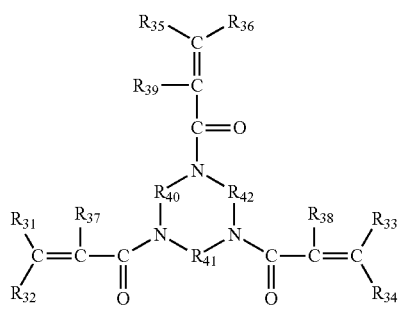

wherein in Chemical Formula 2D,
$R_{31}$ to $R_{39}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group, and $R_{40}$ to $R_{42}$ are each independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, oxygen, or sulfur, Chemical Formula 2E

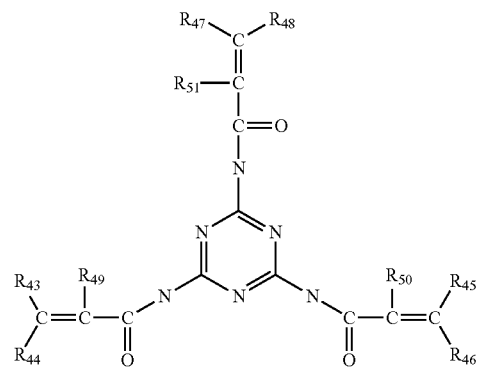

wherein in Chemical Formula 2E,
$R_{43}$ to $R_{51}$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group.

13. The aerogel-foam composite of claim 11, wherein the substituted or unsubstituted bis(meth)acrylamide or the substituted or unsubstituted tris(meth)acrylamide of the second polymer is methylenebis(meth)acrylamide, N,N-hexamethylenebis(meth)acrylamide, N,N-(p-phenylene)bis(meth) acrylamide, 4,4-methylenebis(phenyl(meth)acrylamide), N,N-(methylenebis-1,4-phenylene)bis((2-propene)amide), N,N-(methylenebis-1,4-phenylene)bis(acrylamide), 1,4-bis((meth)acryloyl)piperazine, 1,3,5-tri(meth)acryloylhexahydro-1,3,5-triazine, or a combination thereof.

14. The aerogel-foam composite of claim 11, wherein the second polymer comprises a moiety represented by the following Chemical Formulas 2F, 2G, 2H, or a combination thereof:

Chemical Formula 2F

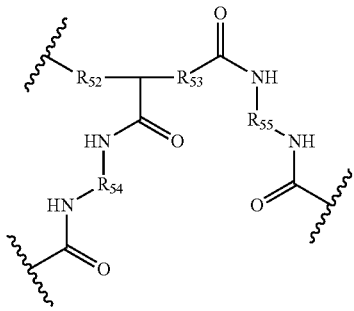

Chemical Formula 2G

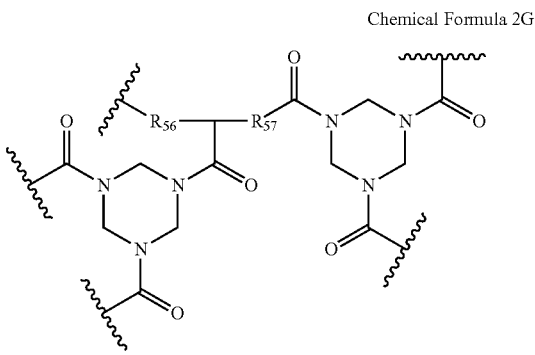

Chemical Formula 2H

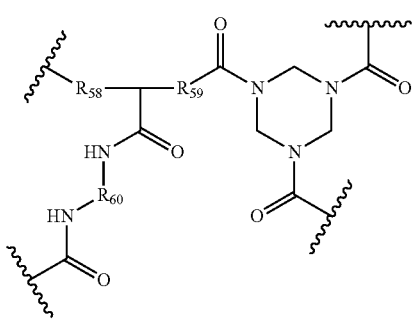

wherein in Chemical Formulae 2F to 2H, $R_{52}$ to $R_{60}$ are each independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, or a substituted or unsubstituted C2 to C30 alkenylene group.

15. The aerogel-foam composite of claim 1, wherein the aerogel matrix polymer further comprises a third polymer that is a crosslinked product of a substituted or unsubstituted alkyl cellulose compound and a substituted or unsubstituted diisocyanate compound.

16. The aerogel-foam composite of claim 15, wherein the substituted or unsubstituted alkyl cellulose compound of the third polymer comprises a compound represented by following Chemical Formula 3A:

Chemical Formula 3A

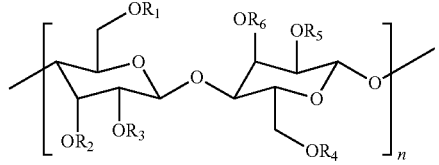

wherein in Chemical Formula 3A,
$R_1$ to $R_6$ are each independently hydrogen, or a C1 to C10 alkyl group, provided that at least one of $R_1$ to $R_6$ is the C1 to C10 alkyl group, and n is about 10 to about 1000.

17. The aerogel-foam composite of claim 15, wherein the substituted or unsubstituted diisocyanate compound of the third polymer is a substituted or unsubstituted alkylene diphenyl diisocyanate compound, an aliphatic diisocyanate, an alicyclic diisocyanate, an aromatic diisocyanate, or a combination thereof.

18. The aerogel-foam composite of claim 17, wherein the substituted or unsubstituted alkylene diphenyl diisocyanate compound is a compound represented by the following Chemical Formula 3B:

Chemical Formula 3B

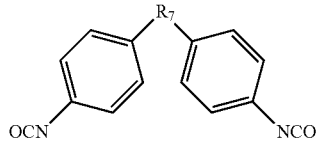

wherein in Chemical Formula 3B, $R_7$ is a single bond or a C1 to C20 alkylene group.

19. The aerogel-foam composite of claim 1, wherein the aerogel matrix polymer further comprises a fourth polymer that is a polybenzoxazine polymerization product of
a second aryl compound comprising at least two hydroxyl groups,
an amine compound comprising at least two amine groups, and
a second aldehyde compound.

20. The aerogel-foam composite of claim 19, wherein the second aryl compound having at least two hydroxyl groups of the fourth polymer is represented by the following Chemical Formula 4A:

Chemical Formula 4A

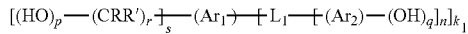

wherein in Chemical Formula 4A,
$Ar_1$ and $Ar_2$ are each independently a substituted or unsubstituted C6 to C30 arylene group, a substituted or unsubstituted C3 to C30 heteroarylene group, or a substituted or unsubstituted C7 to C30 alkylarylene group, provided that each $Ar_1$ comprises at least one unsubstituted ring carbon at a position alpha to the hydroxyl group, and $Ar_2$ includes at least one unsubstituted ring carbon at a position alpha to the —(CRR')$_r$—(OH)$_p$ group, each $L_1$ is independently a single bond, —O—, —C(O)—, —S—, —SO$_2$—, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group, R and R' are each independently hydrogen or a substituted or unsubstituted C1 to C10 alkyl group, r is an integer ranging from 0 to 4, s and n are each independently an integer ranging from 1 to 5, p and q are each independently an integer ranging from 1 to 4, and p+q is 2 or more provided that when $k_1$ is 0, p is 2, 3, or 4, and $k_1$ is an integer ranging from 0 to 4, wherein r+$k_1$ is 1 to 6, and is determined by the valence of $Ar_1$.

21. The aerogel-foam composite of claim 20, wherein $L_1$ is a linker represented by the following Chemical Formula 4C:

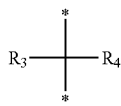

Chemical Formula 4C wherein in Chemical Formula 4C, $R_3$ and $R_4$ are each independently a substituted or unsubstituted C1 to C10 alkyl group, a substituted or unsubstituted C1 to C10 alkoxy group, a substituted or unsubstituted C3 to C20 cycloalkyl group, or a substituted or unsubstituted C6 to C18 aryl group.

22. The aerogel-foam composite of claim 19, wherein the amine compound having at least two amine groups is represented by the following Chemical Formula 4D:

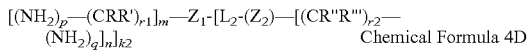

Chemical Formula 4D wherein in Chemical Formula 5D, $Z_1$ and $Z_2$ are each independently a substituted or unsubstituted C6 to C30 arylene group, a substituted or unsubstituted C3 to C30 heteroarylene group, a substituted or unsubstituted C7 to C30 alkylarylene group, or —NR— wherein R is hydrogen, a C1 to C20 alkyl group or an amine substituted C6 to C30 aryl group, each $L_2$ is independently a single bond, —O—, —C(O)—, —S—, —S(O)$_2$—, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C0 to C30 heteroalkylene group, a substituted or unsubstituted C2 to C30 heterocycloalkylene group, or a substituted or unsubstituted C2 to C30 alkenylene group, n and m are each independently an integer ranging from 1 to 5, p and q are each independently an integer ranging from 1 to 4, provided that when $k_2$ is zero p is at least 2, R, R', R" and R''' are each independently hydrogen or C1 to C10 alkyl group, r1 and r2 are each independently an integer ranging from 0 to 4, and $k_2$ is an integer ranging from 0 to 4, wherein m+$k_2$ is selected according to a valence of $Z_1$.

23. The aerogel-foam composite of claim 1, wherein the aerogel matrix polymer further comprises a fifth polymer that is a polymerization product of a third aryl compound comprising at least two hydroxy groups and at least two aryl groups linked to each other by a linker, a fourth aryl compound comprising at least two hydroxy groups and at least two aryl groups fused to each other, or a combination thereof, and a hydroxyl-substituted benzene, and a third aldehyde compound.

24. The aerogel-foam composite of claim 23, wherein the third aryl compound comprising at least two hydroxyl groups and at least two aryl groups and linked to each other by a linker of the fifth polymer is represented by the following Chemical Formula 5A:

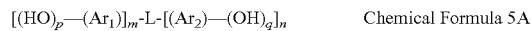

Chemical Formula 5A wherein in Chemical Formula 5A, $Ar_1$ and $Ar_2$ are each independently a substituted or unsubstituted C6 to C30 aryl group, a substituted or unsubstituted C3 to C30 heteroaryl group, or a substituted or unsubstituted C7 to C30 alkylaryl group, L is a single bond, —O—, —C(O)—, —S—, —S(O)$_2$—, —P(O)R—, —P(RR'R"), a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C12 to C18 arylalkylenearylenealkylene group, a substituted or unsubstituted C1 to C30 heteroalkylene group, a substituted or unsubstituted C2 to C30 heterocycloalkylene group, or a substituted or unsubstituted C2 to C30 alkenylene group, wherein R in —P(O)(R)— is hydrogen, a C1 to C10 alkyl group, or a C6 to C20 aryl group and R, R', and R" in —P(RR'R") are each independently hydrogen, a C1 to C10 alkyl group, or a C6 to C20 aryl group, n and m are each independently an integer ranging from 1 to 5, and n+m is selected according to a valence of L, and p and q are each independently an integer ranging from 1 to 4.

25. The aerogel-foam composite of claim 23, wherein the fourth aryl compound comprising at least two hydroxy groups and at least two aryl groups fused to each other of the fifth polymer is represented by the following Chemical Formula 5B:

Chemical Formula 5B wherein in Chemical Formula 5B, $Ar_3$ is a substituted or unsubstituted C10 to C30 aryl group, a substituted or unsubstituted C7 to C30 arylalkyl group, or a substituted or unsubstituted C2 to C30 heteroaryl group, provided that each of the foregoing groups comprises a fused aryl moiety, and r and s are each independently an integer ranging from 1 to 5, wherein r+s is determined by the valence of $Ar_3$.

26. The aerogel-foam composite of claim 23, wherein the hydroxyl substituted benzene of the fifth polymer is represented by the following Chemical Formula 5F:

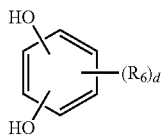

Chemical Formula 5F wherein in Chemical Formula 5F,
each $R_6$ is independently hydrogen, a hydroxyl group, a substituted or unsubstituted C1 to C10 alkyl group, a substituted or unsubstituted C1 to C10 alkoxy group, —NRR', —OR, —NH(C(O))R, —OC(O)R, a substituted or unsubstituted C6 to C18 aryl group, or —CH═CRR', wherein R and R' in —NRR', —OR, —NH(C(O))R, —OC(O)R, or —CH═CRR' are each independently hydrogen, or a substituted or unsubstituted C1 to C10 alkyl group, and d is an integer of 1 or 2.

27. The aerogel-foam composite of claim 1, wherein the aerogel matrix polymer further comprises a sixth polymer that is a polymerization product of
a substituted or unsubstituted maleimide compound, and
a compound having at least two double bonds reactive with the substituted or unsubstituted maleimide compound.

28. The aerogel-foam composite of claim 27, wherein the substituted or unsubstituted maleimide compound of the sixth polymer comprises the compound represented by following Chemical Formula 6A:

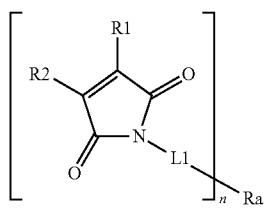

Chemical Formula 6A wherein in Chemical Formula 6A,
R1 and R2 are each independently hydrogen, or a substituted or unsubstituted C1 to C30 alkyl group,
each L1 is independently a single bond, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, or a substituted or unsubstituted C2 to C30 alkenylene group, and
n is 1 to 3,
wherein when n is 1, Ra is a substituted or unsubstituted C3 to C30 cycloalkyl group, a substituted or unsubstituted C6 to C30 aryl group, a substituted or unsubstituted C3 to C30 heterocycloalkyl group, or a substituted or unsubstituted C6 to C30 heteroaryl group, or Ra is hydrogen if L1 is not a single bond, and
when n is 2 or 3, Ra is a substituted or unsubstituted C3 to C30 cycloalkylene group, a substituted or unsubstituted C6 to C30 arylene group, a substituted or unsubstituted C3 to C30 cycloalkylene group including N, O, S, or P, a substituted or unsubstituted C6 to C30 arylene group including N, O, S, or P, or a combination thereof.

29. The aerogel-foam composite of claim 27, wherein the compound having at least two double bonds reactive with the substituted or unsubstituted maleimide compound comprises a compound represented by the following Chemical Formulae 6F to 6I:

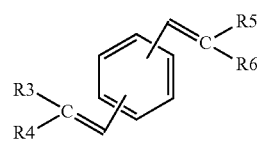

Chemical Formula 6F

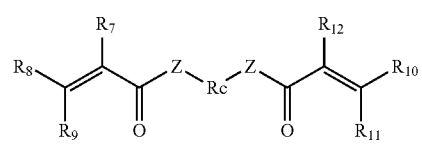

Chemical Formula 6G

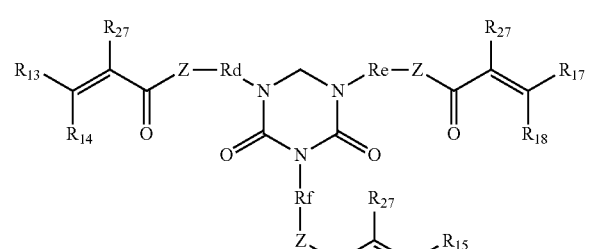

Chemical Formula 6H

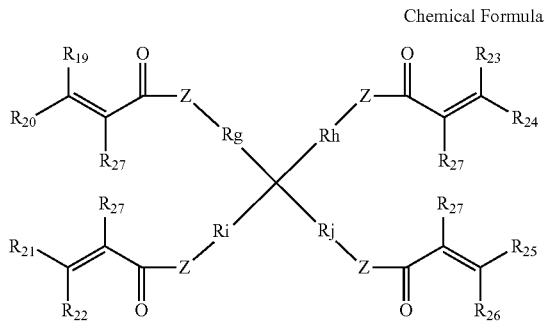

Chemical Formula 6I wherein in Chemical Formulae 6F to 6I,
R3 to R27 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted C1 to C10 alkoxy group, a substituted or unsubstituted C2 to C10 carbonyl group, or a hydroxyl group,
Rc to Rj are each independently a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 arylalkylene group, a substituted or unsubstituted C1 to C30 heteroalkylene group, a substituted or unsubstituted C2 to C30 heterocycloalkylene group, a substituted or unsubstituted C2 to C30 alkenylene group, and each Z is independently O or NH.

30. The aerogel-foam composite of claim 1, wherein the aerogel matrix polymer further comprises a seventh polymer that is a polymerization product of
an aromatic compound comprising at least two unsaturated functional groups, and
a monomer comprising at least two (meth)(acryloyl groups reactive with the at least two unsaturated functional groups.

31. The aerogel-foam composite of claim 30, wherein the monomer having at least two (meth)acryloyl groups reactive with the at least two unsaturated groups is represented by the following Chemical Formula 7B:

Chemical Formula 7B

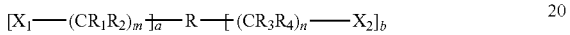

$[X_1\text{---}(CR_1R_2)_m\text{---}]_a\text{---}R\text{---}[(CR_3R_4)_n\text{---}X_2]_b$ wherein in Chemical Formula 7B,
$X_1$ and $X_2$ are each independently a N-(meth)acrylamido group or a (meth)acrylate group,
R is a substituted or unsubstituted C1 to C30 alkyl group, a substituted or unsubstituted C6 to C30 aryl group, or a substituted or unsubstituted C2 to C30 heteroaryl group,
$R_1$, $R_2$, $R_3$ and $R_4$ are each independently hydrogen, a substituted or unsubstituted C1 to C10 alkyl group, a substituted or unsubstituted C1 to C10 alkoxy group, —NRR', —OR—, —NH(C(O))R, —OC(O)R, a substituted or unsubstituted C6 to C18 aryl group, or —CH═CRR', wherein R and R' in —NRR', —OR, —NH(C(O))R, —OC(O)R, and —CH═CRR' are each independently hydrogen or a substituted or unsubstituted C1 to C10 alkyl group, m and n are each independently an integer ranging from 0 to about 20, with the proviso that when R is an arylene group or a heteroarylene group, then m and n are each independently an integer ranging from about 3 to about 20, and a and b are each independently an integer ranging from 0 to 4, with the proviso that a and b are not simultaneously 0, and a+b is a valence of R, and is an integer of 2 or more.

32. An aerogel-foam composite comprising:
an open cell foam and an aerogel matrix disposed in the open cell foam,
wherein the open cell foam is a polyurethane foam comprising a carbonate group, and
wherein the aerogel matrix polymer comprises a first polymer that is a polymerization product of a first aryl compound comprising at least one hydroxy group, a first aldehyde compound, and a polyol compound.

33. The aerogel-foam composite of claim 32, wherein the open cell foam has porosity of about 90% or more.

34. The aerogel-foam composite of claim 32, wherein the open cell foam comprises a polymer comprising a first structural unit having a carbonate group, a second structural unit having an urethane group, and a third structural unit having an urea group.

35. The aerogel-foam composite of claim 32, wherein the polyurethane comprises a structural unit including a carbonate group in an amount of about 5 to about 30 weight percent.

* * * * *